US012639004B2

(12) United States Patent (10) Patent No.: US 12,639,004 B2
Fujikawa (45) Date of Patent: May 26, 2026

(54) MEMORY SYSTEM

(71) Applicant: Kioxia Corporation, Tokyo (JP)

(72) Inventor: Hisashi Fujikawa, Ebina (JP)

(73) Assignee: KIOXIA CORPORATION, Tokyo (JP)

( * ) Notice: Subject to any disclaimer, the term of this patent is extended or adjusted under 35 U.S.C. 154(b) by 0 days.

(21) Appl. No.: 18/797,852

(22) Filed: Aug. 8, 2024

(65) Prior Publication Data

US 2025/0053334 A1 Feb. 13, 2025

(30) Foreign Application Priority Data

Aug. 10, 2023 (JP) ................................. 2023-131077

(51) Int. Cl.
*G06F 3/06* (2006.01)
(52) U.S. Cl.
CPC .......... *G06F 3/0656* (2013.01); *G06F 3/0604* (2013.01); *G06F 3/0659* (2013.01); *G06F 3/0679* (2013.01)
(58) Field of Classification Search
CPC .... G06F 3/0656; G06F 3/0604; G06F 3/0659; G06F 3/0679
See application file for complete search history.

(56) References Cited

U.S. PATENT DOCUMENTS

2011/0055457 A1* 3/2011 Yeh ..................... G06F 12/0246
                                                    711/E12.001
2017/0269856 A1 9/2017 Ouyang
2019/0163620 A1 5/2019 Muthiah et al.
2020/0073795 A1* 3/2020 Asano ................... G06F 3/0656
2021/0382648 A1* 12/2021 Kanno ................. G06F 3/0688
2022/0076773 A1* 3/2022 Tokutomi ............... G11C 29/44
2022/0342585 A1 10/2022 Sharma et al.

OTHER PUBLICATIONS

An article titled "How is NAND Flash memory array organized?" that details device may be composed of two planes, and a plane is composed of blocks which is composed of pages. (Year: 2015).*
Microsoft dictionary definition for the term latch. (Year: 2002).*
Microsoft definition for buffer (Year: 2002).*

* cited by examiner

*Primary Examiner* — Janice M. Girouard
(74) *Attorney, Agent, or Firm* — Maier & Maier, PLLC

(57) ABSTRACT

According to one embodiment, a memory system includes a nonvolatile memory chip, a buffer, and a controller. The nonvolatile memory chip includes a memory cell array. The buffer is capable of storing data received in accordance with receiving a write request from a host. In a case where a piece of data of a first size is written in a write operation for the nonvolatile memory chip, the controller performs a data transfer operation of transferring a piece of data of a second size smaller than the first size from the buffer to the nonvolatile memory chip multiple times. The controller writes, into the memory cell array, pieces of data of the second size transferred to the nonvolatile memory chip by performing the data transfer operation the multiple times, respectively.

8 Claims, 17 Drawing Sheets

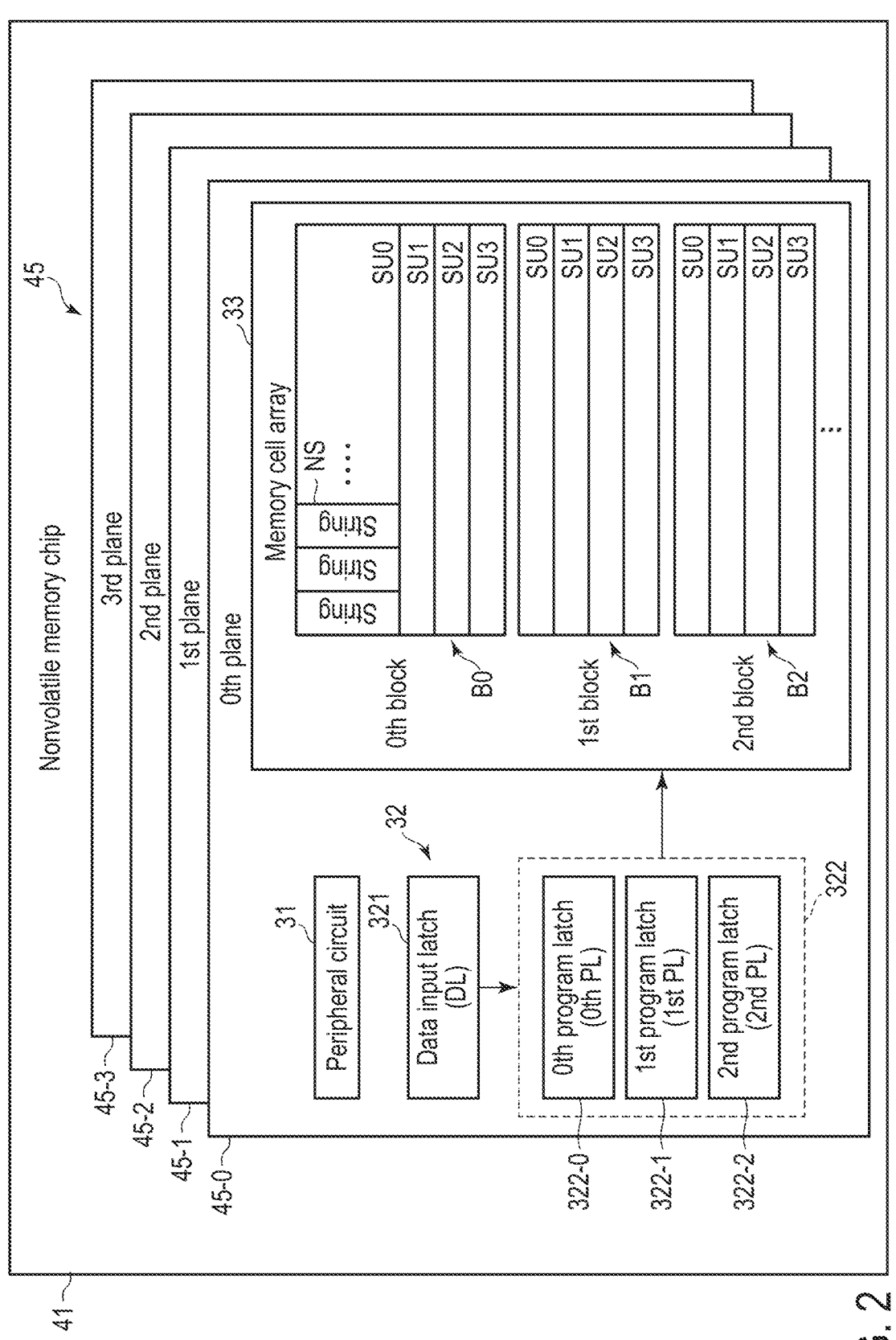
F I G. 2

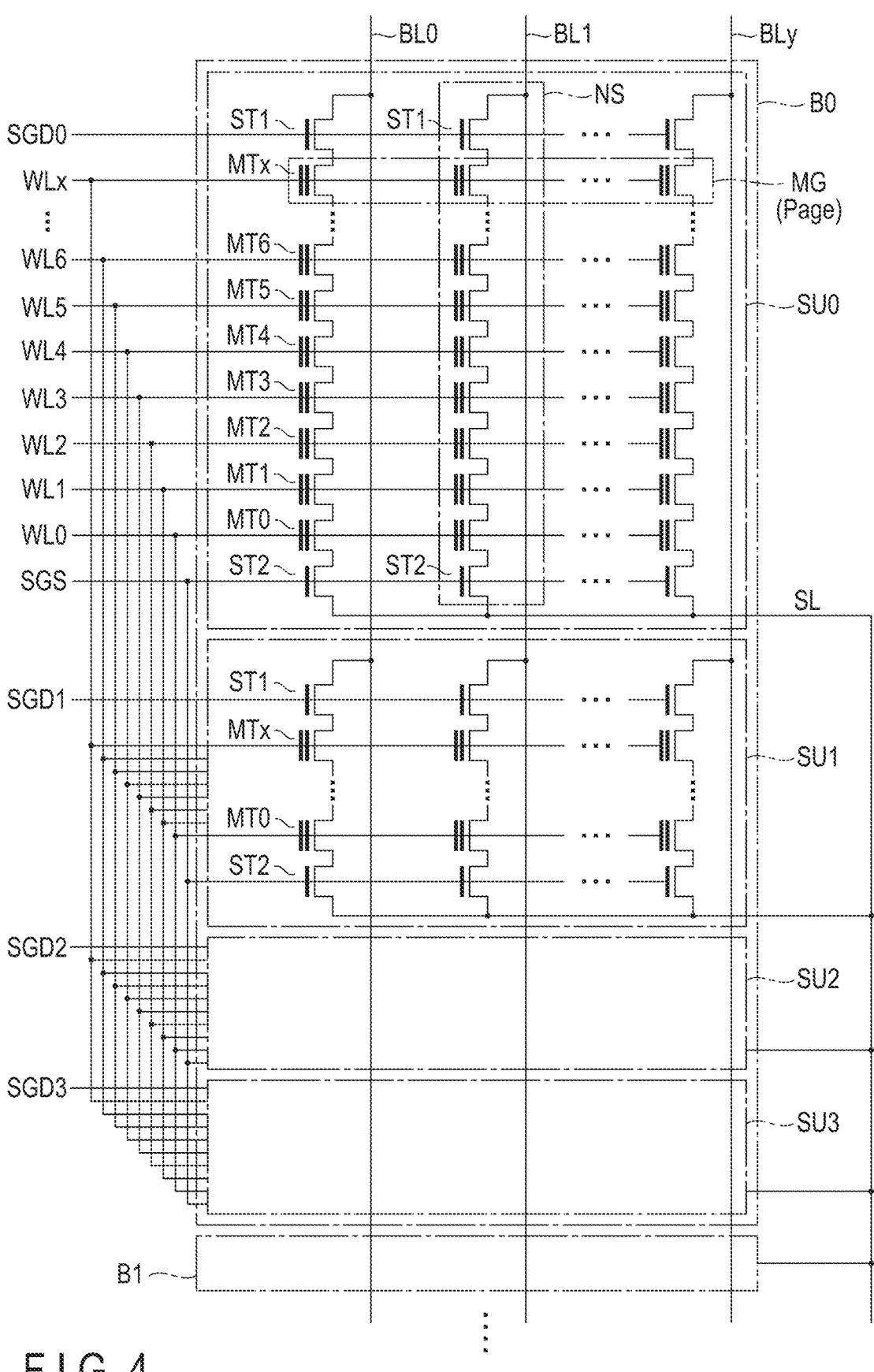
F I G. 4

| String | Page | PB0 | PB1 | PB2 | PB3 | |
|--------|------|-----|-----|-----|-----|---|
| 0 | Lower | 0 | 1 | 2 | 3 | ⎫ |
| 0 | Middle | 4 | 5 | 6 | 7 | ⎬ One full-sequence program operation |
| 0 | Upper | 8 | 9 | 10 | 11 | ⎭ |
| 1 | Lower | 12 | 13 | 14 | 15 | |
| 1 | Middle | 16 | 17 | 18 | 19 | |
| 1 | Upper | 20 | 21 | 22 | 23 | |
| 2 | Lower | ... | ... | ... | ... | |
| 2 | Middle | ... | ... | ... | ... | |
| 2 | Upper | ... | ... | ... | ... | |

FIG. 5

| String | Page | 0th nonvolatile memory chip 41A-0 | | | | 1st nonvolatile memory chip 41A-1 | | | | 2nd nonvolatile memory chip 41A-2 | | | | 3rd nonvolatile memory chip 41A-3 | | | |
|---|---|---|---|---|---|---|---|---|---|---|---|---|---|---|---|---|---|
| | | PB0 | PB1 | PB2 | PB3 | PB0 | PB1 | PB2 | PB3 | PB0 | PB1 | PB2 | PB3 | PB0 | PB1 | PB2 | PB3 |
| 0 | Lower | 0 | 1 | 2 | 3 | 12 | 13 | 14 | 15 | 24 | 25 | 26 | 27 | 36 | 37 | 38 | 39 |
| | Middle | 4 | 5 | 6 | 7 | 16 | 17 | 18 | 19 | 28 | 29 | 30 | 31 | 40 | 41 | 42 | 43 |
| | Upper | 8 | 9 | 10 | 11 | 20 | 21 | 22 | 23 | 32 | 33 | 34 | 35 | 44 | 45 | 46 | 47 |
| 1 | Lower | 48 | 49 | 50 | 51 | 60 | 61 | 62 | 63 | 72 | 73 | 74 | 75 | 84 | 85 | 86 | 87 |
| | Middle | 52 | 53 | 54 | 55 | 64 | 65 | 66 | 67 | 76 | 77 | 78 | 79 | 88 | 89 | 90 | 91 |
| | Upper | 56 | 57 | 58 | 59 | 68 | 69 | 70 | 71 | 80 | 81 | 82 | 83 | 92 | 93 | 94 | 95 |
| 2 | Lower | ⋮ | ⋮ | ⋮ | ⋮ | ⋮ | ⋮ | ⋮ | ⋮ | ⋮ | ⋮ | ⋮ | ⋮ | ⋮ | ⋮ | ⋮ | ⋮ |
| | Middle | ⋮ | ⋮ | ⋮ | ⋮ | ⋮ | ⋮ | ⋮ | ⋮ | ⋮ | ⋮ | ⋮ | ⋮ | ⋮ | ⋮ | ⋮ | ⋮ |
| | Upper | ⋮ | ⋮ | ⋮ | ⋮ | ⋮ | ⋮ | ⋮ | ⋮ | ⋮ | ⋮ | ⋮ | ⋮ | ⋮ | ⋮ | ⋮ | ⋮ |

FIG.6

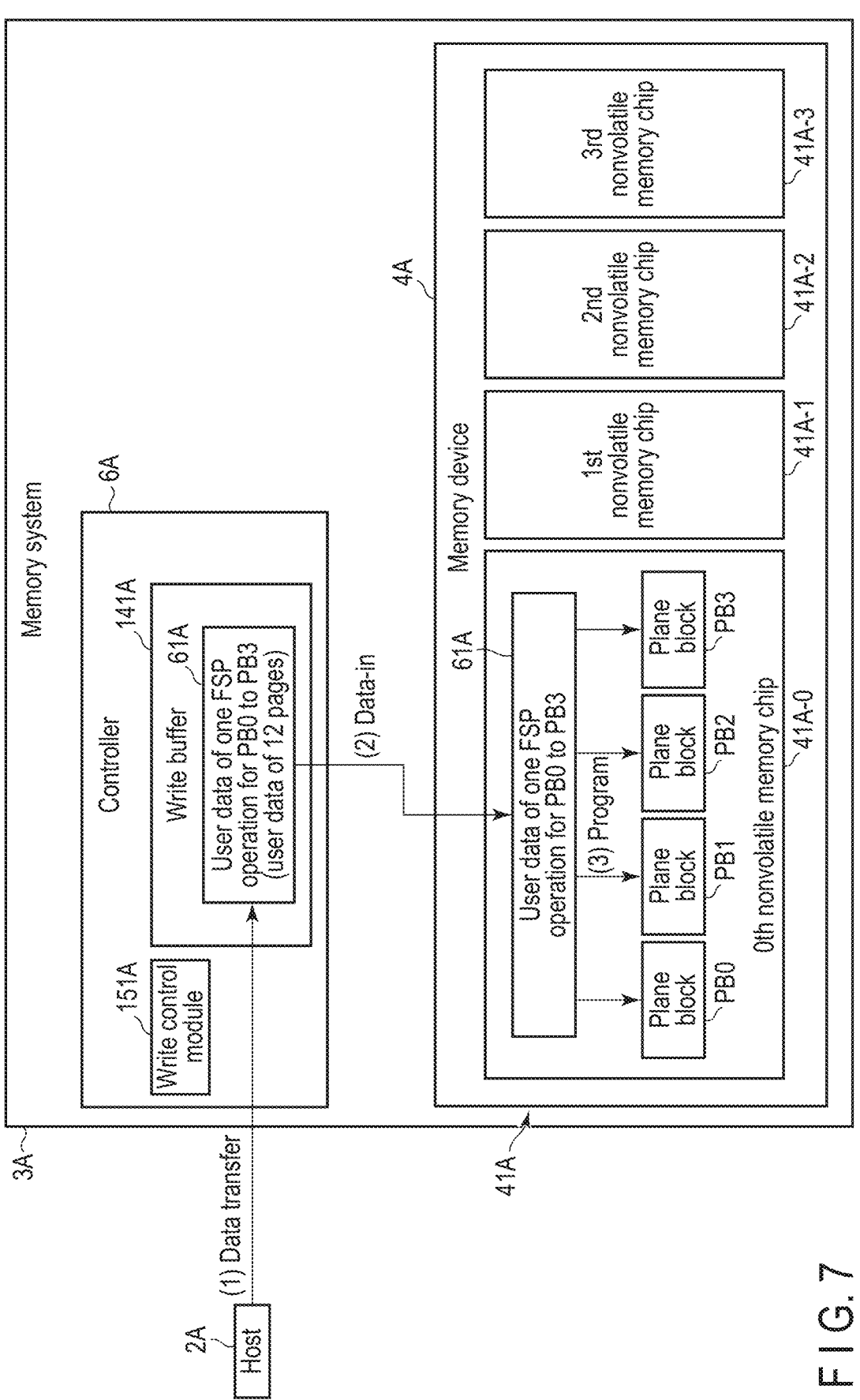
F I G. 7

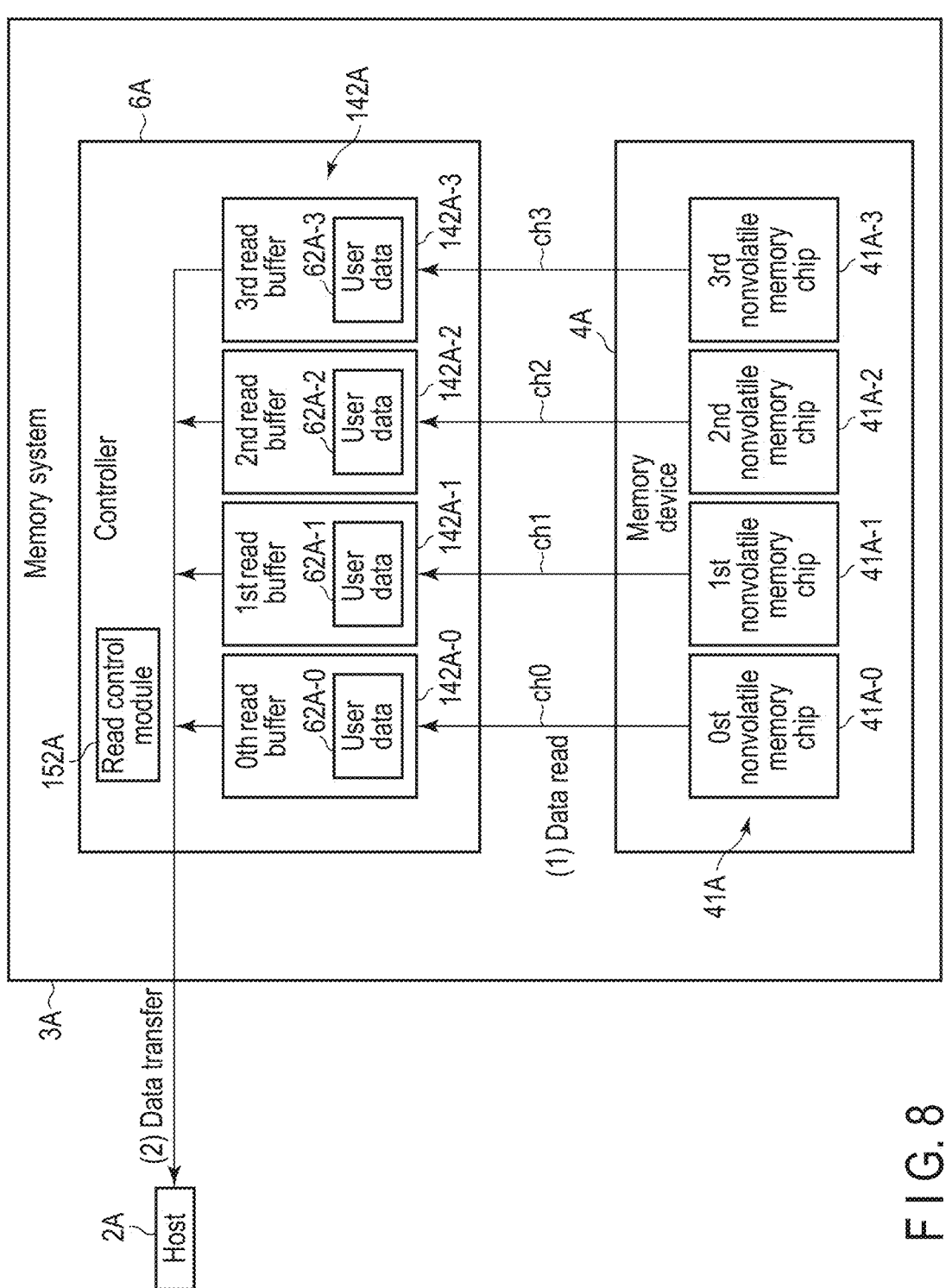
F I G. 8

| String | Page | 0th nonvolatile memory chip 41A-0 | | | | 1st nonvolatile memory chip 41A-1 | | | | 2nd nonvolatile memory chip 41A-2 | | | | 3rd nonvolatile memory chip 41A-3 | | | |
|---|---|---|---|---|---|---|---|---|---|---|---|---|---|---|---|---|---|
| | | PB0 | PB1 | PB2 | PB3 | PB0 | PB1 | PB2 | PB3 | PB0 | PB1 | PB2 | PB3 | PB0 | PB1 | PB2 | PB3 |
| 0 | Lower | 0 | 1 | 2 | 3 | 4 | 5 | 6 | 7 | 8 | 9 | 10 | 11 | 12 | 13 | 14 | 15 |
| | Middle | 16 | 17 | 18 | 19 | 20 | 21 | 22 | 23 | 24 | 25 | 26 | 27 | 28 | 29 | 30 | 31 |
| | Upper | 32 | 33 | 34 | 35 | 36 | 37 | 38 | 39 | 40 | 41 | 42 | 43 | 44 | 45 | 46 | 47 |
| 1 | Lower | 48 | 49 | 50 | 51 | 52 | 53 | 54 | 55 | 56 | 57 | 58 | 59 | 60 | 61 | 62 | 63 |
| | Middle | 64 | 65 | 66 | 67 | 68 | 69 | 70 | 71 | 72 | 73 | 74 | 75 | 76 | 77 | 78 | 79 |
| | Upper | 80 | 81 | 82 | 83 | 84 | 85 | 86 | 87 | 88 | 89 | 90 | 91 | 92 | 93 | 94 | 95 |
| 2 | Lower | ... | ... | ... | ... | ... | ... | ... | ... | ... | ... | ... | ... | ... | ... | ... | ... |
| | Middle | ... | ... | ... | ... | ... | ... | ... | ... | ... | ... | ... | ... | ... | ... | ... | ... |
| | Upper | ... | ... | ... | ... | ... | ... | ... | ... | ... | ... | ... | ... | ... | ... | ... | ... |

FIG.9

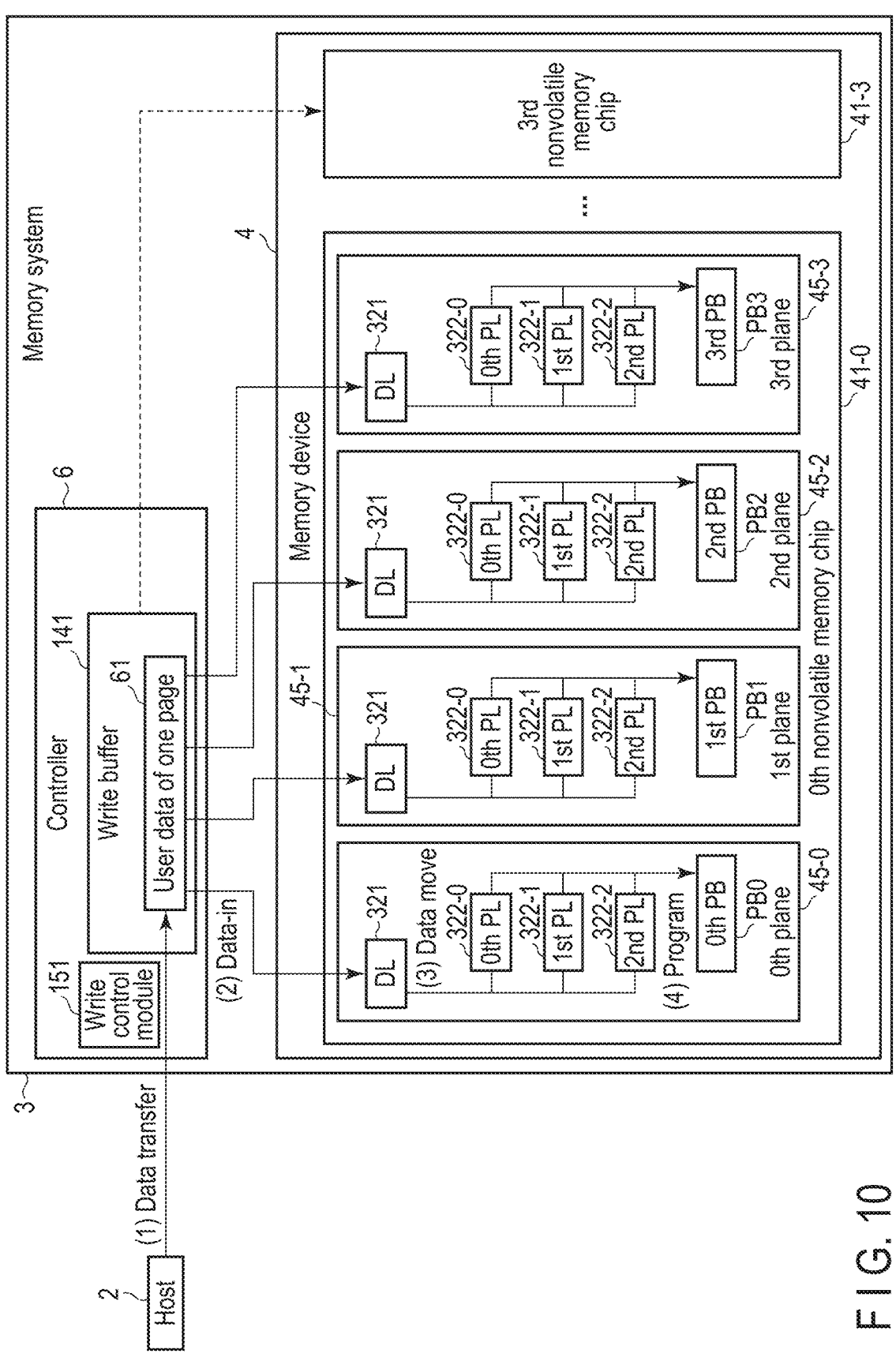
F I G. 10

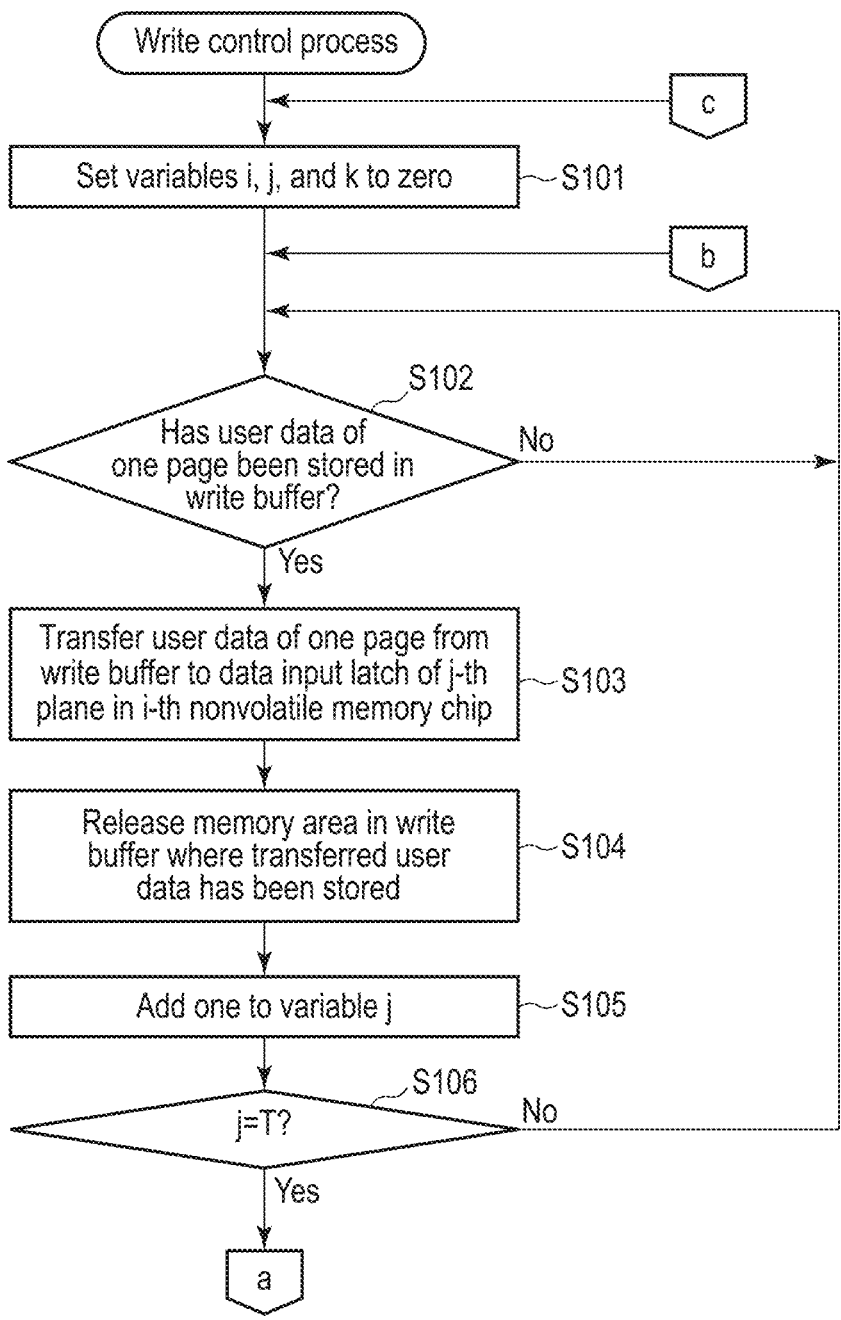
F I G. 12A

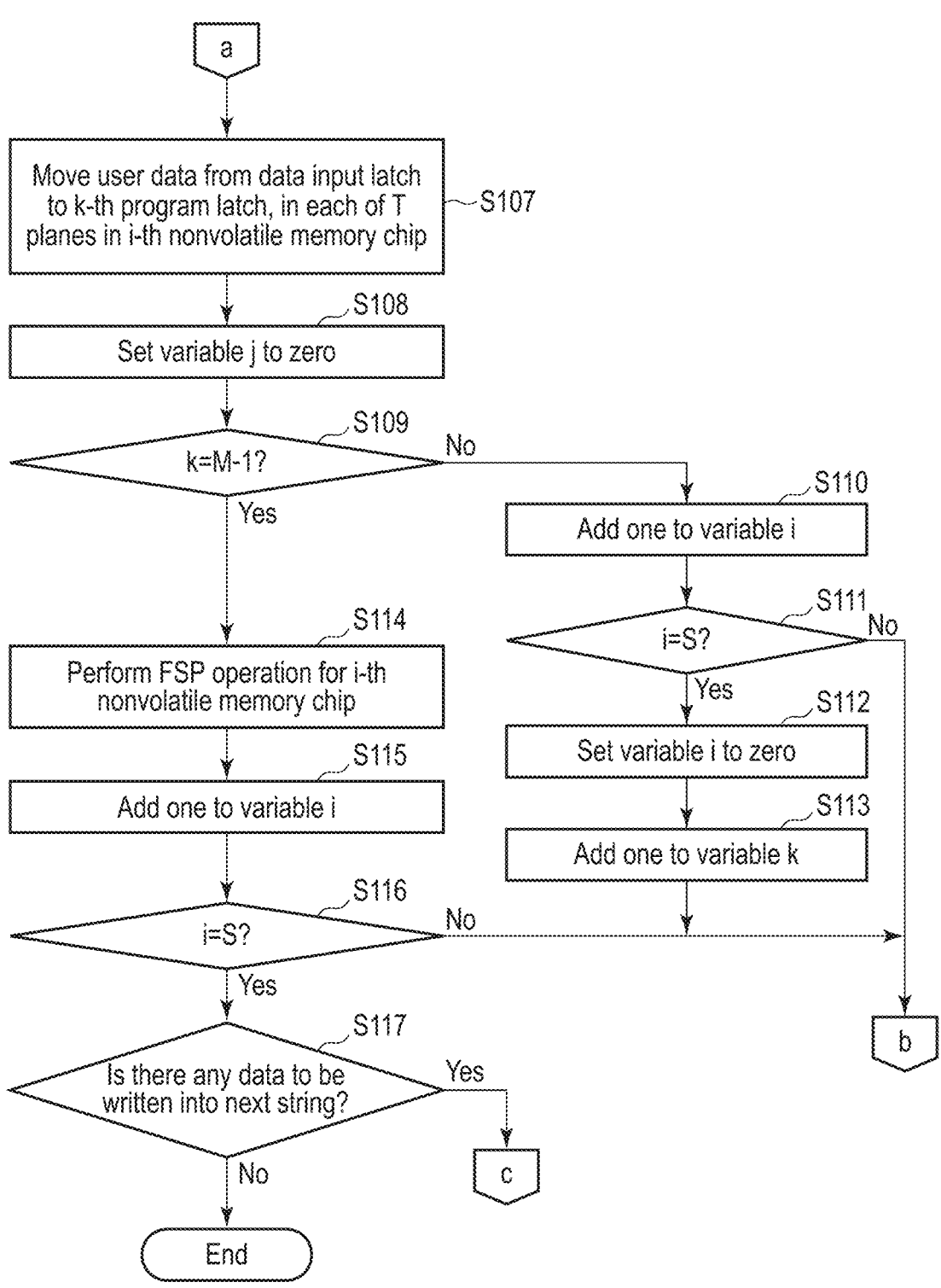
F I G. 12B

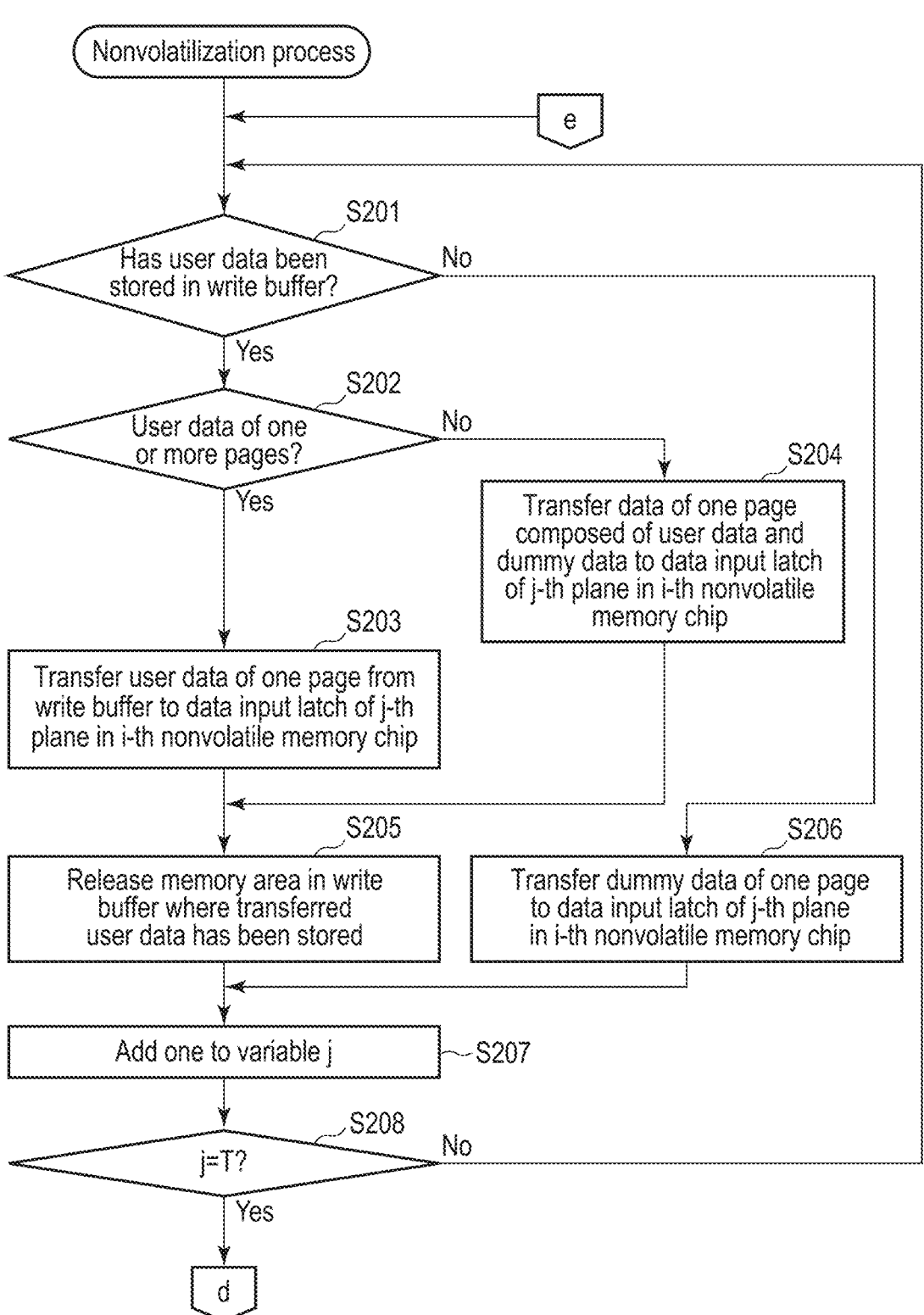
F I G. 13A

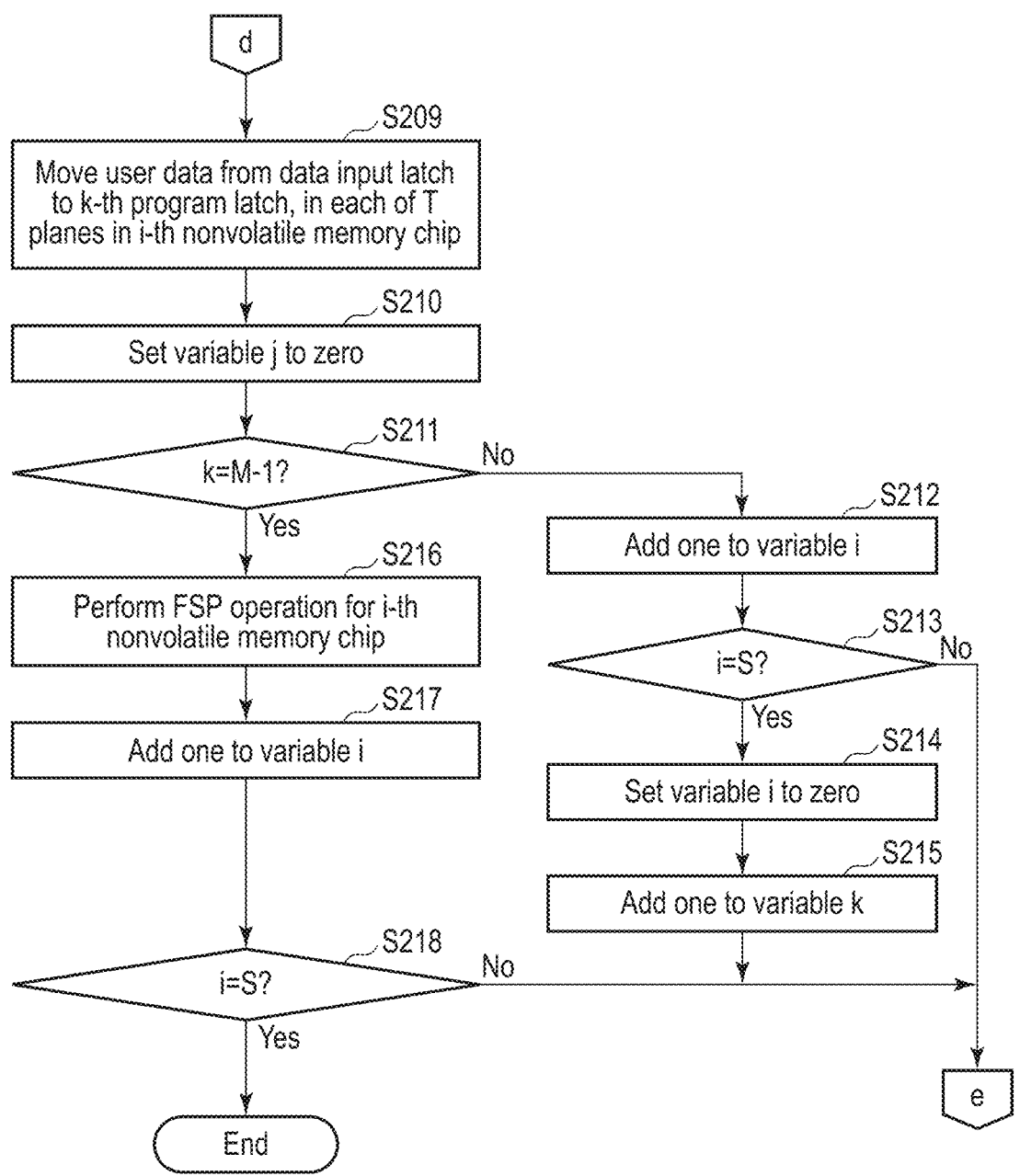
F I G. 13B

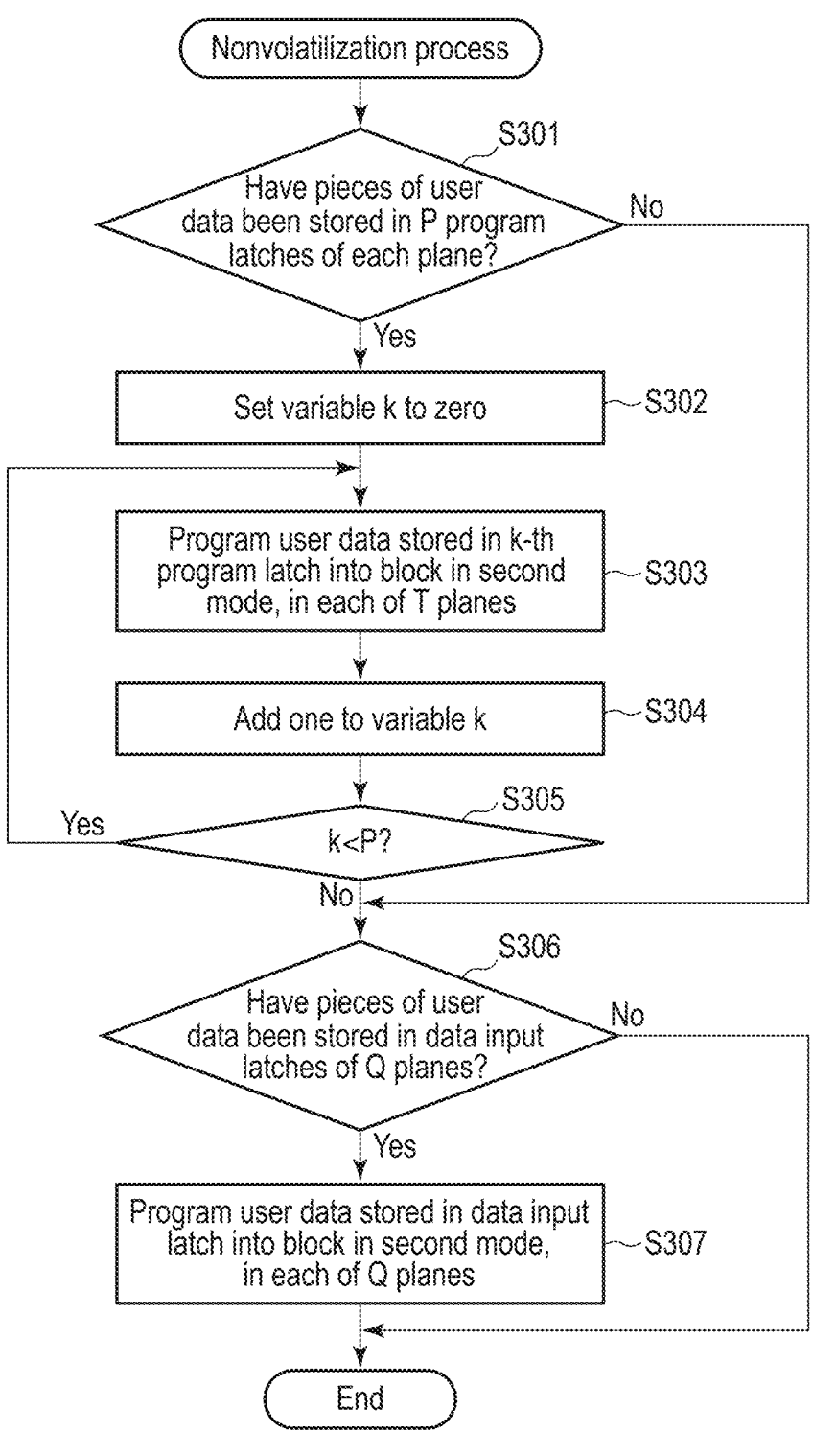
F I G. 15

MEMORY SYSTEM

CROSS-REFERENCE TO RELATED APPLICATIONS

This application is based upon and claims the benefit of priority from Japanese Patent Application No. 2023-131077, filed Aug. 10, 2023, the entire contents of which are incorporated herein by reference.

FIELD

Embodiments described herein relate generally to a technology of controlling a nonvolatile memory.

BACKGROUND

In recent years, memory systems including a nonvolatile memory have been widely used. As one of such memory systems, a solid-state drive (SSDs) that includes a NAND flash memory has been known. The SSD has been used as a main storage for various computing devices.

In a case where a host accesses a nonvolatile memory, a memory system generally includes a data buffer. The access to the nonvolatile memory by the host is, for example, an operation of receiving data from the host and writing the data into the nonvolatile memory and an operation of reading data from the nonvolatile memory and transmitting the data to the host. The data buffer includes, for example, a write buffer and a read buffer. The write buffer stores data to be written into the nonvolatile memory. The read buffer stores data read from the nonvolatile memory. Since the memory system includes the data buffer, the memory system can efficiently perform transmission and reception of data to and from the host, and write and read operations for the nonvolatile memory.

The size of the data buffer may be greatly influenced by a write mode and a write order for the nonvolatile memory. For example, when the write mode and the write order are optimized to reduce the size of the write buffer, there is a possibility that the size of the read buffer increases. In contrast, when the write mode and the write order are optimized to reduce the size of the read buffer, there is a possibility that the size of the write buffer increases.

BRIEF DESCRIPTION OF THE DRAWINGS

FIG. 2 is a block diagram illustrating an example of a configuration of a nonvolatile memory chip included in the memory system according to the first embodiment.

FIG. 4 is a diagram illustrating an example of a circuit configuration of the block included in the memory system according to the first embodiment.

FIG. 5 is a diagram illustrating an example of a write order in a nonvolatile memory chip included in the memory system according to the first embodiment.

FIG. 6 is a diagram illustrating an example of a write order in nonvolatile memory chips included in a memory system according to a comparative example.

FIG. 7 is a diagram illustrating a write operation for the nonvolatile memory chips in the memory system according to the comparative example.

FIG. 8 is a diagram illustrating a read operation for the nonvolatile memory chips in the memory system according to the comparative example.

FIG. 9 is a diagram illustrating another example of the write order in the nonvolatile memory chips included in the memory system according to the comparative example.

FIG. 10 is a diagram illustrating an example of a write operation for nonvolatile memory chips included in the memory system according to the first embodiment.

FIG. 12A is a flowchart illustrating an example of the procedure of a write control process executed in the memory system according to the first embodiment.

FIG. 12B is a flowchart illustrating the example of the procedure of the write control process subsequent to FIG. 12A.

FIG. 13A is a flowchart illustrating an example of the procedure of a nonvolatilization process executed in a memory system according to a second embodiment.

FIG. 13B is a flowchart illustrating an example of the procedure of the nonvolatilization process subsequent to FIG. 13A.

FIG. 15 is a flowchart illustrating an example of the procedure for a nonvolatilization process executed in the memory system according to the third embodiment.

DETAILED DESCRIPTION

In general, according to one embodiment, a memory system includes a nonvolatile memory chip, a write buffer, and a controller. The nonvolatile memory chip includes a memory cell array. The write buffer is capable of storing data received in accordance with receiving a write request from a host. In a case where a piece of data of a first size is written in a write operation for the nonvolatile memory chip, the controller performs a data transfer operation of transferring a piece of data of a second size from the write buffer to the nonvolatile memory chip multiple times. The second size is smaller than the first size. The controller writes, into the memory cell array, pieces of data of the second size transferred to the nonvolatile memory chip by performing the data transfer operation the multiple times, respectively.

Various embodiments will be described hereinafter with reference to the accompanying drawings.

First Embodiment

Figure 1:
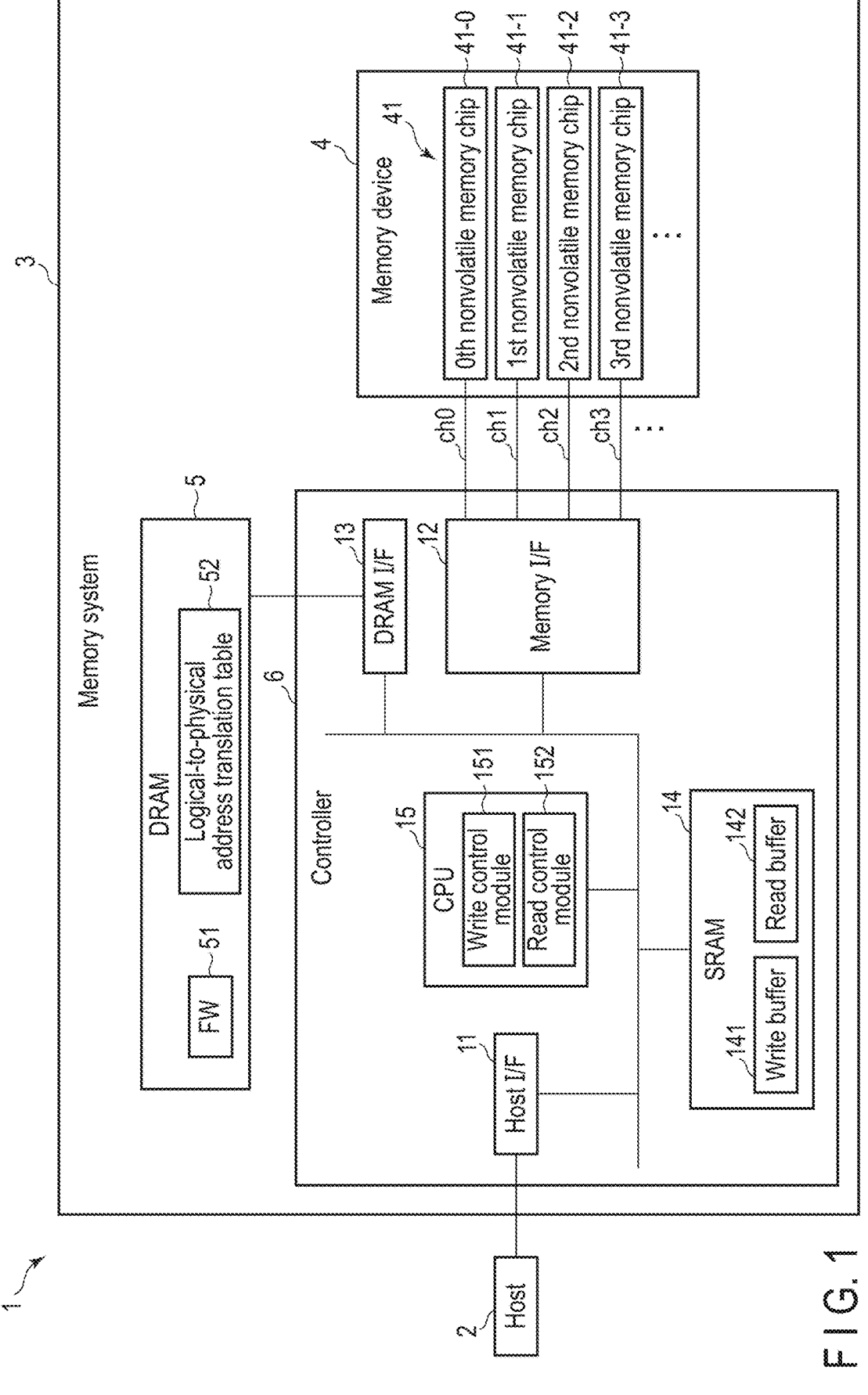
FIG. 1 is a block diagram illustrating an example of a configuration of an information processing system that includes a memory system according to a first embodiment.

First, a configuration of an information processing system 1 that includes a memory system according to a first embodiment will be described with reference to FIG. 1. The information processing system 1 includes a host device 2 and a memory system 3.

The host device 2 may be a storage server that stores a large amount of various data to the memory system 3, or a personal computer. The host device 2 is hereinafter also referred to as a host 2. The memory system 3 is a storage device configured to write data into a nonvolatile memory and to read data from the nonvolatile memory. The nonvolatile memory is, for example, a NAND flash memory.

The memory system 3 is also referred to as a storage device or a semiconductor storage device. The memory system 3 is implemented as, for example, a solid state drive (SSD) or a universal flash storage (UFS) device that includes a NAND flash memory.

The memory system 3 may be used as a storage of the host 2. The memory system 3 may be provided inside the host 2 or may be connected to the host 2 via a cable or a network.

An interface for connecting the host 2 and the memory system 3 conforms to standards of PCI Express™ (PCIe™), Ethernet™, Fibre channel, NVM Express™ (NVMe™), UFS, or the like.

The memory system 3 includes, for example, a memory device 4 and a controller 6. The memory system 3 may further include a DRAM 5.

The memory device 4 includes one or more nonvolatile memory chips 41. The one or more nonvolatile memory chips 41 are, for example, nonvolatile memory chips 41-0, 41-1, 41-2, 41-3, The following description mainly explains a case where the memory device 4 includes the four non-volatile memory chips 41-0, 41-1, 41-2, and 41-3 as an example. Any one of the nonvolatile memory chips 41-0, 41-1, 41-2, 41-3, . . . is also referred to as a nonvolatile memory chip 41. In addition, an i-th nonvolatile memory chip 41 of the nonvolatile memory chips 41-0, 41-1, 41-2, 41-3, . . . is referred to as an i-th nonvolatile memory chip 41. The nonvolatile memory chip 41 is, for example, a NAND flash memory die.

The nonvolatile memory chip 41 includes blocks. The blocks each function as a minimum unit of a data erase operation. The block may also be referred to as an erase block or a physical block. Each of the blocks includes multiple pages. Each of the pages includes a plurality of memory cells connected to a single word line. The pages each function as a unit of a data write operation and a data read operation. Note that a word line may function as a unit of a data write operation and a data read operation.

The tolerable maximum number of program/erase cycles (maximum number of P/E cycles) for each of the blocks is limited. One P/E cycle of a block includes a data erase operation to erase data stored in all memory cells in the block and a data program operation to write data in each page of the block. Note that writing data into a block (more specifically, a memory cell) is equivalent to programming data into a block (memory cell).

The nonvolatile memory chip 41 may be implemented as a flash memory configured to store multiple bits per memory cell.

The flash memory configured to store multiple bits per memory cell is, for example, a multi-level cell (MLC or 4LC) flash memory, a triple-level cell (TLC or 8LC) flash memory, or a quad-level cell (QLC or 16LC) flash memory. The MLC flash memory is configured to store 2-bit data per memory cell. The TLC flash memory is configured to store 3-bit data per memory cell. The QLC flash memory is configured to store 4-bit data per memory cell. A flash memory configured to store 1-bit data per memory cell is also referred to as a single-level cell (SLC or 2LC) flash memory.

In a case where the nonvolatile memory chip 41 is implemented as an MLC flash memory, generally, data of two pages is written into memory cells connected to a single word line. The data of two pages is composed of lower page data and upper page data. Thus, two bits are written per memory cell. Any area in the MLC flash memory (for example, any one or more blocks) may be used as an area configured to store only one bit per memory cell (i.e., an SLC area). In a write operation to write data in the SLC area, only data of one page (lower page data) is written into memory cells connected to a single word line. Accordingly, in each block used as the SLC area, only one bit is written per memory cell as in each block (SLC block) of an SLC flash memory. As a result, each block used as the SLC area functions as a pseudo-SLC block.

In a case where the nonvolatile memory chip 41 is implemented as a TLC flash memory, generally, data of three pages is written in memory cells connected to a single word line. The data of three pages is composed of lower page data, middle page data, and upper page data. Thus, three bits are written per memory cell. Any area in the TLC flash memory (for example, any one or more blocks) may be used as the above-described SLC area, or may be used as an MLC area configured to store two bits per memory cell. Note that the SLC area and the MLC area may be defined by a unit smaller than a block. In the MLC area, only data of two pages is written into memory cells connected to a single word line. Accordingly, in the MLC area, only two bits are written per memory cell.

In a case where the nonvolatile memory chip 41 is implemented as a QLC flash memory, generally, data of four pages is written into memory cells connected to a single word line. Thus, four bits are written per memory cell. Any area in the QLC flash memory (for example, any one or more blocks) may be used as the SLC area, or may be used as the MLC area, or may be used as a TLC area configured to store three bits per memory cell. Note that each of the SLC area, the MLC area, and the TLC area may be defined by a unit smaller than a block. In the TLC area, only data of three pages is written into memory cells connected to a single word line. Accordingly, in the TLC area, only three bits are written per memory cell.

Note that the nonvolatile memory chip 41 may be configured to store five or more bits per memory cell. In this case, any area in the nonvolatile memory chip 41 may be used as an area in which only data of four or less bits is written per memory cell.

The DRAM 5 is a volatile memory. The DRAM 5 includes, for example, a storage area of firmware (FW) 51 and a storage area of a logical-to-physical address translation table 52.

The FW 51 is a program for controlling an operation of the controller 6. The FW 51 is, for example, loaded from the memory device 4 to the DRAM 5.

The controller 6 may be implemented with a circuit such as a system-on-a-chip (SoC). The controller 6 is configured to control the memory device 4. The function of each unit of the controller 6 may be realized by dedicated hardware in the controller 6 or may be realized by a processor executing the FW.

The controller 6 may function as a flash translation layer (FTL) configured to execute data management and block management of the memory device 4. The data management executed by the FTL includes (1) management of mapping data indicative of a relationship between each logical address and each physical address of the memory device 4, and (2) a process to hide a difference between data read/write operations in units of page and data erase operations in units of block. The block management includes management of defective blocks, wear leveling, and garbage collection.

The logical address is used by the host 2 for addressing a storage area of the memory system 3. The logical address is, for example, a logical block address (LBA).

Management of mapping between each logical address and each physical address is executed by using, for example, the logical-to-physical address translation table 52. The controller 6 uses the logical-to-physical address translation table 52 to manage the mapping between each logical address and each physical address in a certain management size. A physical address corresponding to a logical address indicates a physical memory location in the memory device 4 to which data of the logical address is written. The controller 6 manages multiple storage areas that are obtained by logically dividing the storage area of the memory device 4, using the logical-to-physical address translation table 52. These multiple storage areas correspond to multiple logical addresses, respectively. In other words, each of the storage areas is identified by one logical address. The logical-to-physical address translation table 52 may be loaded from the memory device 4 to the DRAM 5 when the memory system 3 is boot up.

The data write operation into one page is executable only once in a single P/E cycle. Thus, the controller 6 writes updated data corresponding to a logical address not to an original physical memory location in which previous data corresponding to the logical address is stored but to a different physical memory location. Then, the controller 6 updates the logical-to-physical address translation table 52 to associate the logical address with this different physical memory location rather than the original physical memory location and to invalidate the previous data (i.e., data stored in the original physical memory location). Data to which the logical-to-physical address translation table 52 refers (that is, data associated with a logical address) is referred to as valid data. Furthermore, data not associated with any logical address is referred to as invalid data. The valid data is data to possibly be read by the host 2 later. The invalid data is data not to be read by the host 2 anymore.

In addition, the controller 6 may execute a write operation for the nonvolatile memory chip 41, for example, in any one of an SLC mode, an MLC mode, a TLC mode, and a QLC mode. The SLC mode is a mode in which one bit is written per memory cell. The MLC mode is a mode in which two bits are written per memory cell. The TLC mode is a mode in which three bits are written per memory cell. The QLC mode is a mode in which four bits are written per memory cell.

The controller 6 may include, for example, a host interface circuit (host I/F) 11, a memory interface circuit (memory I/F) 12, a DRAM interface circuit (DRAM I/F) 13, a static random access memory (SRAM) 14, and a CPU 15. The host I/F 11, the memory I/F 12, the DRAM I/F 13, the SRAM 14, and the CPU 15 may be connected via a bus 10.

The host I/F 11 functions as a circuit configured to receive various commands, for example, an input/output (I/O) command, a control command, and data from the host 2. The I/O command is, for example, a write command or a read command. The control command is, for example, a flush command. In addition, the host I/F 11 functions as a circuit that transmits a response to a command and data to the host 2.

The memory I/F 12 electrically connects the controller 6 and the memory device 4. The memory I/F 12 conforms to an interface standard such as a toggle double data rate (DDR) and an open NAND flash interface (ONFI).

The memory I/F 12 functions as a NAND control circuit configured to control the memory device 4. The memory I/F 12 may be connected to the nonvolatile memory chips 41 in the memory device 4 via multiple channels ch0, ch1, ch2, ch4, . . . , respectively. By operating the nonvolatile memory chips 41 in parallel, it is possible to broaden an access bandwidth between the controller 6 and the memory device 4.

The DRAM I/F 13 functions as a DRAM control circuit configured to control access to the DRAM 5.

The SRAM 14 is a volatile memory. The SRAM 14 includes, for example, a buffer area in which data is temporarily stored. The buffer area includes, for example, a write buffer 141 and a read buffer 142. The write buffer 141 temporarily stores user data to be written into the nonvolatile memory chip 41. The read buffer 142 temporarily stores user data read from the nonvolatile memory chip 41. Note that storage areas in the DRAM 5 may be allocated as the write buffer 141 and the read buffer 142. In addition, storage areas in the SRAM 14 may be allocated as the storage area of the FW 51 and the storage area of the logical-to-physical address translation table 52. In a case where the storage areas in the SRAM 14 are allocated as the write buffer 141, the read buffer 142, the storage area of the FW 51, and the storage area of the logical-to-physical address translation table 52, the memory system 3 may not include the DRAM 5.

The CPU 15 is a processor configured to control the host I/F 11, the memory I/F 12, the DRAM I/F 13, and the SRAM 14. The CPU 15 performs various processes by executing the FW 51 loaded from the memory device 4 to the DRAM 5. The FW 51 is a control program that includes instructions for causing the CPU 15 to execute the various processes. The CPU 15 may execute a command process for processing various commands from the host 2, and the like. The operation of the CPU 15 is controlled by the FW 51 executed by the CPU 15.

The function of each component of the controller 6 may be realized by dedicated hardware in the controller 6 or may be realized by the CPU 15 executing the FW 51.

The CPU 15 functions as, for example, a write control module 151 and a read control module 152. The CPU 15 functions as each of these modules by, for example, executing the FW 51.

The write control module 151 controls an operation of receiving user data from the host 2 and writing the user data into the nonvolatile memory chip 41 in accordance with receiving a write request (e.g., a write command) from the host 2. The read control module 152 controls an operation of reading user data from the nonvolatile memory chip 41 and transmitting the user data to the host 2 in accordance with receiving a read request (e.g., a read command) from the host 2.

A configuration of the nonvolatile memory chip 41 will be more specifically described here. FIG. 2 is a block diagram illustrating an example of the configuration of the nonvolatile memory chip 41.

The nonvolatile memory chip 41 includes, for example, T planes 45. T is an integer of one or more. FIG. 2 illustrates an example in which the T planes 45 are four planes 45-0, 45-1, 45-2, and 45-3.

Each of the T planes 45 includes a peripheral circuit 31, latches 32, and a memory cell array 33.

The peripheral circuit 31 is a circuit that controls the memory cell array 33. The peripheral circuit 31 includes, for example, a row decoder, a column decoder, and a sense amplifier. The peripheral circuit 31 may perform, for the memory cell array 33, a program operation (i.e., write operation), a sense operation (i.e., read operation), and an erase operation.

The latches 32 are circuits each of which includes a storage area temporarily storing data transferred between the controller 6 and the nonvolatile memory chip 41. The latches 32 are also referred to as registers or buffers. In a data write operation, data received from the controller 6 is temporarily stored in the latches 32 and then programmed into the memory cell array 33. In the following description, an operation of transferring (inputting) data, which is received from the controller 6 and stored in the write buffer 141, to the latches 32 is referred to as a data-in operation. In addition, an operation of programming data stored in the latches 32 into the memory cell array 33 is referred to as a program operation. The latches 32 includes, for example, a data input latch (DL) 321 and M program latches (PL) 322. M is an integer of one or more.

The data input latch 321 temporarily stores data transferred from the write buffer 141.

Each of the M program latches 322 temporarily stores data transferred from the data input latch 321. Pieces of data stored in all the M program latches 322 are written into the memory cell array 33 all together, for example, in a program operation. Specifically, in a case where data is written into the memory cell array 33 in the TLC mode, data of three pages stored in three program latches 322 are written into the memory cell array 33 all together in a program operation, for example. The three program latches 322 are also referred to as a zeroth program latch (0th PL) 322-0, a first program latch (1st PL) 322-1, and a second program latch (2nd PL) 322-2.

The memory cell array 33 includes multiple blocks. Each of the blocks includes nonvolatile memory cell transistors arranged in a matrix. In the following description, the nonvolatile memory cell transistors are simply referred to as memory cells. FIG. 2 illustrates an example in which the blocks are blocks B0, B1, B2, . . . .

Each of the blocks includes string units. FIG. 2 illustrates an example in which each of the blocks includes four string units SU0, SU1, SU2, and SU3.

Each of the string units is a set of memory cells. Each of the string units includes, for example, NAND strings NS. Each of the NAND strings NS is a set of memory cells connected in series.

Figure 3:
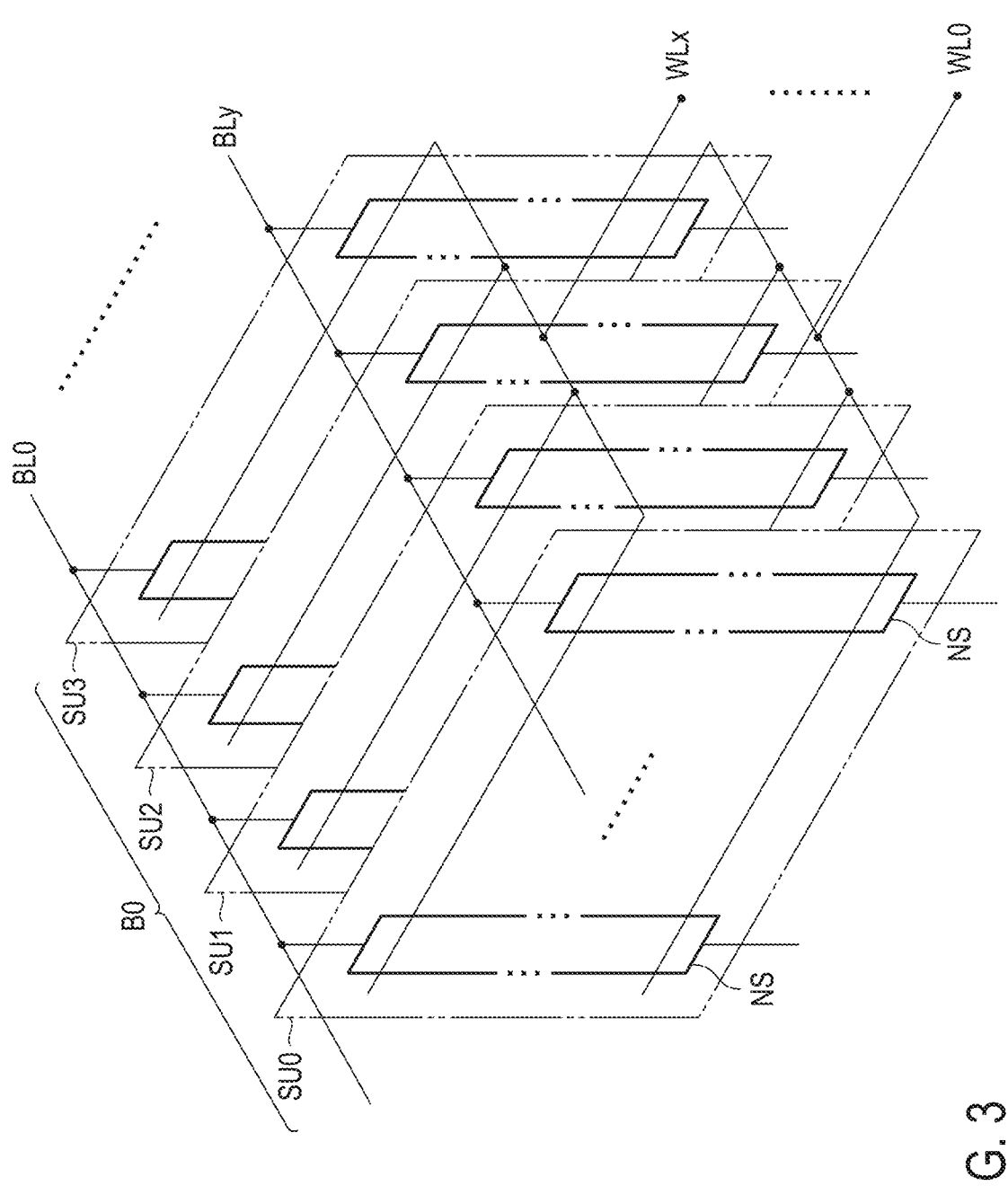
FIG. 3 is a perspective view illustrating an example of a configuration of a block included in the memory system according to the first embodiment.

The configuration of the blocks included in the memory cell array 33 will be more specifically described with reference to FIG. 3 and FIG. 4. FIG. 3 and FIG. 4 illustrate an example of a configuration of the block B0, and the other blocks in the memory cell array 33 also have a similar configuration.

FIG. 3 is a perspective view illustrating an example of the configuration of the block B0.

The block B0 includes the four string units SU0, SU1, SU2, and SU3.

The four string units SU0, SU1, SU2, and SU3 are arranged in a direction (horizontal direction in FIG. 3) orthogonal to a direction (vertical direction in FIG. 3) in which word lines WL0, . . . , WLx are stacked. Each of the four string units SU0, SU1, SU2, and SU3 includes the NAND strings NS.

One end of each of the NAND strings NS is connected to a corresponding bit line among bit lines BL0, . . . , BLy. Each of the NAND strings NS extends in the vertical direction. Control gates of the memory cells included in each of the NAND strings NS are connected to the word lines WL0, . . . , WLx, respectively.

FIG. 4 illustrates an example of a circuit configuration of the block B0.

Each of the NAND strings NS includes, for example, memory cells MT0, . . . , MTx and two select transistors ST1 and ST2. Each of the memory cells MT0, . . . , MTx includes a control gate and a charge storage layer and stores data in a non-volatile way. The memory cells MT0, . . . , MTx are connected in series between a source of the select transistor ST1 and a drain of the select transistor ST2. A drain of the select transistor ST1 is connected to a corresponding bit line among the bit lines BL0, . . . , BLy. A source of the select transistor ST2 is connected to a source line SL common to the string units SU0, SU1, SU2, and SU3.

A gate of the select transistor ST1 in the string unit SU0 is connected to a select gate line SGD0 corresponding to the string unit SU0. A gate of the select transistor ST1 in the string unit SU1 is connected to a select gate line SGD1 corresponding to the string unit SU1. A gate of the select transistor ST1 in the string unit SU2 is connected to a select gate line SGD2 corresponding to the string unit SU2. A gate of the select transistor ST1 in the string unit SU3 is connected to a select gate line SGD3 corresponding to the string unit SU3.

The gates of the select transistors ST2 in the string units SU0, SU1, SU2, and SU3 are connected to a common select gate line SGS. Note that the gates of the select transistors ST2 in the string units SU0, SU1, SU2, and SU3 may be connected to select gate lines differing between the string units. The control gates of the memory cells MT0, . . . , MTx included in the block B0 are connected to the common word lines WL0, . . . , WLx, respectively.

Each of the program operation and the sense operation by the peripheral circuit 31 may be performed for memory cells connected to one word line in one string unit at once. A set of memory cells selected at once in each of the program operation and the sense operation is referred to as a memory cell group.

In a case where each memory cell is configured to store 1-bit data, data stored per memory cell group is referred to as data of one page. For example, in a case where each memory cell is configured to store 3-bit data, data stored per memory cell group is data of three pages.

The erase operation by the peripheral circuit 31 is performed, for example, in units of block. That is, data stored in all the memory cells included in one block is erased at once.

Next, a relationship between a write mode and a write order for the nonvolatile memory chip 41 and the sizes (capacities) of the write buffer 141 and the read buffer 142 will be described. The write order represents the order of addresses in the nonvolatile memory chip 41 to which pieces of data are written. The write order is also referred to as write addressing.

The sizes of the write buffer 141 and the read buffer 142 may be influenced by the write mode and the write order for the nonvolatile memory chip 41. For example, when the write mode and the write order are optimized to reduce the size of the write buffer 141, there is a possibility that the size of the read buffer 142 increases. In contrast, when the write mode and the write order are optimized to reduce the size of the read buffer 142, there is a possibility that the size of the write buffer 141 increases.

The following description explains a case where a full-sequence program (FSP) operation is used as the write mode for the nonvolatile memory chip 41. The FSP operation is a program operation in which data of multiple pages are programmed into one or more blocks all together. For example, in a case where data is programmed into a block in the nonvolatile memory chip 41 in the TLC mode, an FSP operation in which data of three pages (lower page data, middle page data, and upper page data) is transferred (input) to the nonvolatile memory chip 41 and the transferred data of three pages is programmed into one block at once is performed. Note that the following description is not limited to the case where the TLC mode is used, but can be similarly applied to any case where a specific amount of data is programmed into one or more blocks at once.

An FSP operation may be performed for a single block or may be performed for multiple blocks that are included in the multiple planes 45, respectively, in the nonvolatile memory chip 41. A block included in each of the multiple planes 45 is also referred to as a plane block (PB). Performing a program operation for multiple plane blocks that are included in the multiple planes 45, respectively, is also referred to as multi-plane program. In a case where the nonvolatile memory chip 41 includes the multiple planes 45, the multi-plane program is generally used in consideration of program performance.

FIG. 5 illustrates an example of the write order in one nonvolatile memory chip 41. It is here assumed that an FSP operation according to the TLC mode and the multi-plane program is performed for the nonvolatile memory chip 41 that includes the four planes 45. The four planes 45 are the zeroth plane 45-0, the first plane 45-1, the second plane 45-2, and the third plane 45-3.

Four write target blocks that area included in the four planes 45, respectively, are referred to as plane blocks PB0, PB1, PB2, and PB3. Specifically, the plane block PB0 is a write target block in the zeroth plane 45-0 to which data is to be written in the TLC mode. The plane block PB1 is a write target block in the first plane 45-1 to which data is to be written in the TLC mode. The plane block PB2 is a write target block in the second plane 45-2 to which data is to be written in the TLC mode. The plane block PB3 in the third plane 45-3 to which data is to be written in the TLC mode. The location in each plane block into which data is to be written in an FSP operation is, for example, identified by a string number.

As illustrated in FIG. 5, in an FSP operation corresponding to a string number "0", page data is input (transferred) to the nonvolatile memory chip 41 in the following order of (0) to (11): (0) lower page data for the plane block PB0; (1) lower page data for the plane block PB1; (2) lower page data for the plane block PB2; (3) lower page data for the plane block PB3; (4) middle page data for the plane block PB0; (5) middle page data for the plane block PB1; (6) middle page data for the plane block PB2; (7) middle page data for the plane block PB3; (8) upper page data for the plane block PB0; (9) upper page data for the plane block PB1; (10) upper page data for the plane block PB2; and (11) upper page data for the plane block PB3. Each of the numbers indicating the order corresponds to a numerical value in a field that is specified by one of the lower, middle, and upper pages and one of the plane blocks PB0, PB1, PB2, and PB3 in a corresponding string number (here, string number "0") of FIG. 5.

The data of 12 pages input in the order of (0) to (11) is data written in the FSP operation. The data of 12 pages is programmed into the plane blocks PB0, PB1, PB2, and PB3 in the input order.

Then, the data write order proceeds in the string direction. Specifically, the string number increases from zero to one. In an FSP operation corresponding to a string number "1", data of 12 pages is input to the nonvolatile memory chip 41 in the order of (12) to (23). The specific page data input in the order of (12) to (23) is similar to the page data input in the order of (0) to (11). The input data of 12 pages is programmed into the plane blocks PB0, PB1, PB2, and PB3 in the input order.

After that, an FSP operation corresponding to an increased string number may be sequentially performed in a similar way.

In the memory system 3, an interleave write operation may be performed in order to improve the program performance. The interleave write operation is write operations performed for the nonvolatile memory chips 41 in parallel.

Here, an interleave write operation for nonvolatile memory chips in a memory system according to a comparative example will be described with reference to FIG. 6 and FIG. 7.

FIG. 6 illustrates an example of a write order in the nonvolatile memory chips included in the memory system according to the comparative example. It is here assumed that the memory system of the comparative example includes four nonvolatile memory chips and an FSP operation according to the TLC mode and the multi-plane program is performed for the four nonvolatile memory chips each including four planes. The four nonvolatile memory chips are a zeroth nonvolatile memory chip 41A-0, a first nonvolatile memory chip 41A-1, a second nonvolatile memory chip 41A-2, and a third nonvolatile memory chip 41A-3. In each of the nonvolatile memory chips 41A-0, 41A-1, 41A-2, and 41A-3, four write target blocks included in the respective four planes are referred to as plane blocks PB0, PB1, PB2, and PB3.

As illustrated in FIG. 6, in an FSP operation corresponding to a string number "0", page data is first input to the zeroth nonvolatile memory chip 41A-0 in the order of (0) to (11). The page data input in the order of (0) to (11) is similar to the page data input in the order of (0) to (11) described above with reference to FIG. 5. Each of the numbers indicating the order corresponds to a numerical value in a field that is specified by one of the lower, middle, and upper pages and one of the plane blocks PB0, PB1, PB2, and PB3, in a corresponding combination of a string number and a nonvolatile memory chip (here, a combination of the string number "0" and the zeroth nonvolatile memory chip 41A-0) of FIG. 6.

The data of 12 pages input in the order of (0) to (11) is data written into the zeroth nonvolatile memory chip 41A-0 in the FSP operation. The data of 12 pages is programmed into the plane blocks PB0, PB1, PB2, and PB3 of the zeroth nonvolatile memory chip 41A-0 in the input order.

In a case where the interleave write operation for the nonvolatile memory chips is performed, the write order proceeds, not in the string direction, but in the chip direction, after the data input to the zeroth nonvolatile memory chip 41A-0 in the order of (0) to (11). Here, the write order proceeds from the zeroth nonvolatile memory chip 41A-0 to the first nonvolatile memory chip 41A-1.

Accordingly, page data is next input to the first nonvolatile memory chip 41A-1 in the order of (12) to (23). The specific page data input in the order of (12) to (23) is similar to the page data input in the order of (0) to (11), but the target of the data-in operation is changed from the zeroth nonvolatile memory chip 41A-0 to the first nonvolatile memory chip 41A-1.

The data of 12 pages input in the order of (12) to (23) is data written into the first nonvolatile memory chip 41A-1 in an FSP operation. The data of 12 pages is programmed into the plane blocks PB0, PB1, PB2, and PB3 of the first nonvolatile memory chip 41A-1 in the input order.

Then, page data is input to the second nonvolatile memory chip 41A-2 in the order of (24) to (35). The specific page data input in the order of (24) to (35) is similar to the page data input in the order of (0) to (11), but the target of the data-in operation is changed from the zeroth nonvolatile memory chip 41A-0 to the second nonvolatile memory chip 41A-2.

The data of 12 pages input in the order of (24) to (35) is data written into the second nonvolatile memory chip 41A-2 in an FSP operation. The data of 12 pages is programmed into the plane blocks PB0, PB1, PB2, and PB3 of the second nonvolatile memory chip 41A-2 in the input order.

Then, page data is input to the third nonvolatile memory chip 41A-3 in the order of (36) to (47). The specific page data input in the order of (36) to (47) is similar to the page data input in the order of (0) to (11), but the target of the data-in operation is changed from the zeroth nonvolatile memory chip 41A-0 to the third nonvolatile memory chip 41A-3.

The data of 12 pages input in the order of (36) to (47) is data written into the third nonvolatile memory chip 41A-3 in an FSP operation. The data of 12 pages is programmed into the plane blocks PB0, PB1, PB2, and PB3 of the third nonvolatile memory chip 41A-3 in the input order.

After the data-in operations for the four nonvolatile memory chips 41A-0, 41A-1, 41A-2, and 41A-3 is performed in the order of (0) to (47), the write order proceeds in the string direction (i.e., the direction in which the string number increases). After that, FSP operations for the nonvolatile memory chips 41A-0, 41A-1, 41A-2, and 41A-3 may be sequentially performed in a similar way according to an increased string number.

In a write process in accordance with a write request from a host, pieces of data received from the host are programmed into the nonvolatile memory chips 41A-0, 41A-1, 41A-2, and 41A-3 in order. In order to perform an FSP operation for each of the nonvolatile memory chips 41A-0, 41A-1, 41A-2, and 41A-3, data of 12 pages (=data of three pages×four PBs) needs to be input to each nonvolatile memory chip. That is, when data of 12 pages has not been input, an FSP operation for a nonvolatile memory chip cannot be performed. For this reason, for example, a controller of the memory system of the comparative example starts inputting (transferring) data of 12 pages to a nonvolatile memory chip after the data of 12 pages is accumulated in a write buffer.

FIG. 7 illustrates a write operation for the nonvolatile memory chips 41A-0, 41A-1, 41A-2, and 41A-3 when the write order illustrated in FIG. 6 is used in the memory system 3A of the comparative example. The memory system 3A performs the write operation in accordance with a write request from a host 2A.

The memory system 3A includes a memory device 4A and a controller 6A. The memory device 4A includes the nonvolatile memory chips 41A-0, 41A-1, 41A-2, and 41A-3. Each of the nonvolatile memory chips 41A-0, 41A-1, 41A-2, and 41A-3 includes four planes. In FIG. 7, in the zeroth nonvolatile memory chip 41A-0, four plane blocks PB0, PB1, PB2, and PB3 included in the respective four planes are allocated as write target blocks in the TLC mode.

The controller 6A includes a write control module 151A that controls the write operation, and a write buffer 141A. The write control module 151A stores, in the write buffer 141A, user data transferred from the host 2A in accordance with receiving a write request from the host 2A ((1) in FIG. 7).

In response to user data 61 necessary to perform an FSP operation for the four plane blocks PB0, PB1, PB2, and PB3 being stored in the write buffer 141A, the write control module 151A performs a data-in operation of inputting the user data 61A from the write buffer 141A to the zeroth nonvolatile memory chip 41A-0 ((2) in FIG. 7). The user data 61A necessary to perform an FSP operation for the four plane blocks PB0, PB1, PB2, and PB3 is user data of 12 pages.

Then, the write control module 151A performs a program operation of programming the user data 61A into the four plane blocks PB0, PB1, PB2, and PB3 ((3) in FIG. 7). Consequently, the FSP operation for the zeroth nonvolatile memory chip 41A-0 (more specifically, the four plane blocks PB0, PB1, PB2, and PB3 in the zeroth nonvolatile memory chip 41A-0) has been completed.

When the data-in operation of inputting the user data 61A from the write buffer 141A to the zeroth nonvolatile memory chip 41A-0 has been completed, the storage area in the write buffer 141A where the user data 61A has been stored is released. Then, for example, user data necessary to perform an FSP operation for the next first nonvolatile memory chip 41A-1 (i.e., another user data of 12 pages) is newly stored in the write buffer 141A. The write control module 151A similarly performs a data-in operation and a program operation for the first nonvolatile memory chip 41A-1 as in the case of the zeroth nonvolatile memory chip 41A-0. Moreover, the write control module 151A similarly performs a data-in operation and a program operation for each of the second nonvolatile memory chip 41A-2 and the third nonvolatile memory chip 41A-3.

In this way, when the write order illustrated in FIG. 6 is used, the size of a storage area allocated as the write buffer 141A requires only the size of data necessary to perform an FSP operation for one nonvolatile memory chip 41A (here, the size of 12 pages). That is, it can be said that the write order illustrated in FIG. 6 is optimized to reduce the size of the write buffer 141A.

On the other hand, when user data written in the write order illustrated in FIG. 6 is read from the nonvolatile memory chips 41A-0, 41A-1, 41A-2, and 41A-3 and transmitted to the host 2A, the size of a read buffer in the controller 6A which temporarily stores the read user data tends to increase.

FIG. 8 illustrates a read operation of data written in the write order illustrated in FIG. 6 for the nonvolatile memory chips 41A-0, 41A-1, 41A-2, and 41A-3 in the memory system 3A of the comparative example. The memory system 3A performs the read operation in accordance with a read request from the host 2A.

The controller 6A and the four nonvolatile memory chips 41A-0, 41A-1, 41A-2, and 41A-3 are connected through data buses of four channels ch0, ch1, ch2, and ch3, respectively. The four nonvolatile memory chips 41A-0, 41A-1, 41A-2, and 41A-3 are capable of sending data to the controller 6A in parallel via the corresponding data buses of the channels ch0, ch1, ch2, and ch3.

The controller 6A includes a read control module 152A that controls the read operation and four read buffers 142A. The four read buffers 142 are a zeroth read buffer 142A-0, a first read buffer 142A-1, a second read buffer 142A-2, and a third read buffer 142A-3. The four read buffers 142A-0, 142A-1, 142A-2, and 142A-3 correspond to the four nonvolatile memory chips 41A-0, 41A-1, 41A-2, and 41A-3, respectively.

In response to receiving a read request from the host 2A, the read control module 152A reads pieces of user data from the four nonvolatile memory chips 41A-0, 41A-1, 41A-2, and 41A-3 in parallel and stores the pieces of read user data in the read buffers 142A-0, 142A-1, 142A-2, and 142A-3 ((1) in FIG. 8). Specifically, the read control module 152A stores, in the zeroth read buffer 142A-0, user data 62A-0 read from the zeroth nonvolatile memory chip 41A-0. The read control module 152A stores, in the first read buffer 142A-1, user data 62A-1 read from the first nonvolatile memory chip 41A-1. The read control module 152A stores, in the second read buffer 142A-2, user data 62A-2 read from the second nonvolatile memory chip 41A-2. The read control module 152A stores, in the third read buffer 142A-3, user data 62A-3 read from the third nonvolatile memory chip 41A-3.

Then, the read control module 152A transfers the user data 62A-0, the user data 62A-1, the user data 62A-2, and the user data 62A-3 to the host 2A in the write order illustrated in FIG. 6 ((2) in FIG. 8). That is, the read control module 152A executes control such that the order in which the user data 62A-0, the user data 62A-1, the user data 62A-2, and the user data 62A-3 stored in the read buffers 142A-0, 142A-1, 142A-2, and 142A-3 are transferred to the host 2A conforms to the write order illustrated in FIG. 6.

For example, the case of the zeroth nonvolatile memory chip 41A-0 in the write order illustrated in FIG. 6 will be explained. In the zeroth nonvolatile memory chip 41A-0, the user data of 12 pages of (0) to (11) is input, and then the user data of 12 pages of (48) to (59) is input.

In addition, the user data of 36 pages of (12) to (47) is input to the first nonvolatile memory chip 41A-1, the second nonvolatile memory chip 41A-2, and the third nonvolatile memory chip 41A-3 between the input of the user data of 12 pages of (0) to (11) and the input of the user data of 12 pages of (48) to (59).

Thus, in the read operation, after the user data of 12 pages of (0) to (11) is transferred to the host 2A, the user data of (48) to (59) is not transferred to the host 2A, until the user data of 36 pages of (12) to (47) read from the first nonvolatile memory chip 41A-1, the second nonvolatile memory chip 41A-2, and the third nonvolatile memory chip 41A-3 is transferred to the host 2A.

In this way, when the user data written in the write order illustrated in FIG. 6 is read from the nonvolatile memory chips 41A-0, 41A-1, 41A-2, and 41A-3 and transferred to the host 2A, the amount of user data that waits for transfer in the read buffers 142A-0, 142A-1, 142A-2, and 142A-3 after being read in order to be transferred to the host 2A in the write order increases. Thus, the size of the storage areas allocated as the read buffers 142A-0, 142A-1, 142A-2, and 142A-3 increases. Accordingly, in the case of the write order illustrated in FIG. 6, the size of the write buffer 141A can be reduced, but there is a possibility that the size of the read buffers 142A-0, 142A-1, 142A-2, and 142A-3 increases.

In contrast, a write order optimized to reduce the size of the read buffers 142A-0, 142A-1, 142A-2, and 142A-3 will be described.

FIG. 9 illustrates another example of the write order in the nonvolatile memory chips included in the memory system according to the comparative example. It is here assumed that as in the example of the write order illustrated in FIG. 6, the memory system 3A of the comparative example includes the four nonvolatile memory chips 41A-0, 41A-1, 41A-2, and 41A-3 and an FSP operation according to the TLC mode and the multi-plane program is performed for the four nonvolatile memory chips 41A-0, 41A-1, 41A-2, and 41A-3 each including four planes. In each of the nonvolatile memory chips 41A-0, 41A-1, 41A-2, and 41A-3, four write target blocks included in the respective four planes are referred to as plane blocks PB0, PB1, PB2, and PB3.

As illustrated in FIG. 9, in an FSP operation corresponding to a string number "0", page data is first input to the zeroth nonvolatile memory chip 41A-0 in the following order of (0) to (3): (0) lower page data for the plane block PB0, (1) lower page data for the plane block PB1, (2) lower page data for the plane block PB2, and (3) lower page data for the plane block PB3. Each of the numbers indicating the order corresponds to a numerical value in a field that is specified by one of the lower, middle, and upper pages and one of the plane blocks PB0, PB1, PB2, and PB3, in a corresponding combination of a string number and a nonvolatile memory chip (here, a combination of the string number "0" and the zeroth nonvolatile memory chip 41A-0) of FIG. 9.

After the lower page data input to the zeroth nonvolatile memory chip 41A-0 in the order of (0) to (3), the data write order proceeds, not in the page direction, but in the chip direction.

Accordingly, lower page data is next input to the first nonvolatile memory chip 41A-1 in the order of (4) to (7). The specific page data input in the order of (4) to (7) is similar to the page data input in the order of (0) to (3), but the target of the data-in operation is changed from the zeroth nonvolatile memory chip 41A-0 to the first nonvolatile memory chip 41A-1.

Then, lower page data is input to the second nonvolatile memory chip 41A-2 in the order of (8) to (11). The specific page data input in the order of (8) to (11) is similar to the page data input in the order of (0) to (3), but the target of the data-in operation is changed from the zeroth nonvolatile memory chip 41A-0 to the second nonvolatile memory chip 41A-2.

Then, lower page data is input to the third nonvolatile memory chip 41A-3 in the order of (12) to (15). The specific page data input in the order of (12) to (15) is similar to the page data input in the order of (0) to (3), but the target of the data-in operation is changed from the zeroth nonvolatile memory chip 41A-0 to the third nonvolatile memory chip 41A-3.

After the lower page data input to the zeroth nonvolatile memory chip 41A-0, the first nonvolatile memory chip 41A-1, the second nonvolatile memory chip 41A-2, and the third nonvolatile memory chip 41A-3 in the order of (0) to (15), the write order proceeds in the page direction.

Accordingly, middle page data input is performed for the zeroth nonvolatile memory chip 41A-0, the first nonvolatile memory chip 41A-1, the second nonvolatile memory chip 41A-2, and the third nonvolatile memory chip 41A-3 in the order of (16) to (31). Then, upper page data input is performed for the zeroth nonvolatile memory chip 41A-0, the first nonvolatile memory chip 41A-1, the second nonvolatile memory chip 41A-2, and the third nonvolatile memory chip 41A-3 in the order of (32) to (47).

The data of 12 pages input in the order of (0) to (3), (16) to (19), and (32) to (35) is data to be written into the zeroth nonvolatile memory chip 41A-0 in an FSP operation. The data of 12 pages is programmed into the plane blocks PB0, PB1, PB2, and PB3 of the zeroth nonvolatile memory chip 41A-0 in the input order.

Similarly, the data of 12 pages input in the order of (4) to (7), (20) to (23), and (36) to (39) is data to be written into the first nonvolatile memory chip 41A-1 in an FSP operation. The data of 12 pages is programmed into the plane blocks PB0, PB1, PB2, and PB3 of the first nonvolatile memory chip 41A-1 in the input order.

The data of 12 pages is similarly programmed into each of the second nonvolatile memory chip 41A-2 and the third nonvolatile memory chip 41A-3 as well.

After the data input to the four nonvolatile memory chips 41A-0, 41A-1, 41A-2, and 41A-3 is performed in the order of (0) to (47), the write order proceeds in the string direction.

After that, FSP operations corresponding to an increased string number may be sequentially performed in a similar way.

As described above with reference to FIG. 8, the controller 6A stores the user data 62A-0, the user data 62A-1, the user data 62A-2, and the user data 62A-3 read from the nonvolatile memory chips 41A-0, 41A-1, 41A-2, and 41A-3 in the read buffers 142A-0, 142A-1, 142A-2, and 142A-3, when having received a read request from the host 2A. Then, the controller 6A executes control such that the user data 62A-0, the user data 62A-1, the user data 62A-2, and the user data 62A-3 stored in the read buffers 142A-0, 142A-1, 142A-2, and 142A-3 are transferred to the host 2A in the write order.

Here, the case of the zeroth nonvolatile memory chip 41A-0 in the write order illustrated in FIG. 9 will be explained. In the zeroth nonvolatile memory chip 41A-0, the user data of four pages is input in the order of (0) to (3), and then the user data of four pages is input in the order of (16) to (19).

In addition, the user data of 12 pages of (4) to (15) is input to the first nonvolatile memory chip 41A-1, the second nonvolatile memory chip 41A-2, and the third nonvolatile memory chip 41A-3 between the input of the user data of four pages of (0) to (3) and the input of the user data of four pages of (16) to (19).

Thus, in the read operation, after the user data of four pages of (0) to (3) is transferred to the host 2A and the user data of 12 pages of (4) to (15) from the first nonvolatile memory chip 41A-1, the second nonvolatile memory chip 41A-2, and the third nonvolatile memory chip 41A-3 is transferred to the host 2A, the user data of four pages of (16) to (19) is transferred to the host 2A.

In contrast, in the read operation when the write order illustrated in FIG. 6 is used, after the user data of (0) to (11) is transferred to the host 2A, the user data of 12 pages of (48) to (59) is stored in the read buffer 142A-0 until the user data of 36 pages of (12) to (47) from the first nonvolatile memory chip 41A-1, the second nonvolatile memory chip 41A-2, and the third nonvolatile memory chip 41A-3 is transferred to the host 2A, as described above.

Accordingly, when the user data written in the write order illustrated in FIG. 9 is read from the nonvolatile memory chips 41A-0, 41A-1, 41A-2, and 41A-3 and transferred to the host 2A, the amount of user data that waits for transfer in the read buffers 142A-0, 142A-1, 142A-2, and 142A-3 after being read decreases, as compared to that in the case where the write order illustrated in FIG. 6 is used. Thus, the size of the storage areas allocated as the read buffers 142A-0, 142A-1, 142A-2, and 142A-3 decreases.

On the other hand, when the write order illustrated in FIG. 9 is used, for example, in order to perform an FSP operation for the zeroth nonvolatile memory chip 41A-0, the controller 6A starts inputting data of 36 pages corresponding to (0) to (35) to the nonvolatile memory chip 41A after the data of 36 pages is accumulated in the write buffer 141A.

In contrast, when the write order illustrated in FIG. 6 is used, the size of the storage area allocated as the write buffer 141A requires only the size of data necessary to perform an FSP operation for one nonvolatile memory chip 41A (e.g., 12 pages).

Accordingly, when user data is written into the nonvolatile memory chips 41A-0, 41A-1, 41A-2, and 41A-3 in the write order illustrated in FIG. 9, the size of the storage area allocated as the write buffer 141A increases, compared to that in the case where the write order illustrated in FIG. 6 is used.

In this way, in the memory system 3A of the comparative example, the size of the write buffer 141A can be reduced but the size of the read buffers 142A cannot be reduced, when the write order illustrated in FIG. 6 is used. In addition, in the memory system 3A of the comparative example, the size of the read buffers 142A can be reduced but the size of the write buffer 141A cannot be reduced, when the write order illustrated in FIG. 9 is used. Therefore, in the memory system 3A of the comparative example, both the sizes of the write buffer 141A and the read buffers 142A cannot be reduced.

In contrast, the memory system 3 of the first embodiment performs a write operation for reducing both the size of the write buffer 141 and the size of the read buffer 142. Specifically, in a case where a piece of user data of a first size is written in a write operation for the nonvolatile memory chip 41, the controller 6 performs a data-in operation of transferring a piece of user data of a second size that is smaller than the first size from the write buffer 141 to the nonvolatile memory chip 41 (more specifically, the latches 32) multiple times. Then, the controller 6 writes, into the memory cell array 33, pieces of user data of the second size transferred to the nonvolatile memory chip 41 by performing the data-in operation the multiple times, respectively. The total size of the pieces of user data of the second size is equal to, for example, the first size.

In this way, the memory system 3 performs the data transfer operation of transferring a piece of user data of the second size from the write buffer 141 to the nonvolatile memory chip 41 multiple times. Thus, in the memory system 3, not only the write buffer 141 but also the nonvolatile memory chip 41 (more specifically, the latches 32) is used as a storage area that buffers user data of the second size. Therefore, in the memory system 3, the size of the write buffer 141 can be reduced, for example, compared to that of the memory system 3A of the comparative example, in which a data-in operation for the nonvolatile memory chip 41A starts after user data of the first size is accumulated in the write buffer 141A. Moreover, in the memory system 3, the size of the read buffer 142 also can be reduced by using the write order illustrated in FIG. 9. Accordingly, in the memory system 3, the size of the data buffer (e.g., the sizes of the write buffer 141 and the read buffer 142) used when the host 2 accesses the nonvolatile memory chip 41 can be reduced.

The write operation in the memory system 3 of the first embodiment will be specifically described.

FIG. 10 illustrates an example of a write operation for the nonvolatile memory chip 41. The description here explains, as an example, an interleave write operation for the four nonvolatile memory chips 41-0, 41-1, 41-2, and 41-3 in a case where the write order illustrated in FIG. 9 is used. That is, it is assumed that FSP operations according to the TLC mode and the multi-plane program are performed for the four nonvolatile memory chips 41-0, 41-1, 41-2, and 41-3 each including the four planes 45. The memory system 3 performs the write operation in accordance with a write request from the host 2. The write operation is, for example, controlled by the CPU 15 functioning as the write control module 151.

In the example illustrated in FIG. 10, four plane blocks PB0, PB1, PB2, and PB3 that are included in the four planes 45-0, 45-1, 45-2, and 45-3, respectively, in the zeroth nonvolatile memory chip 41A-0 are allocated as write target blocks in the TLC mode. An operation of writing user data into the four plane blocks PB0, PB1, PB2, and PB3 in the zeroth nonvolatile memory chip 41A-0 will be described.

The write control module 151 stores, in the write buffer 141, user data transferred from the host 2 in accordance with receiving a write request from the host 2 ((1) in FIG. 10).

The write control module 151 performs an operation of transferring user data of the second size that is smaller than user data of the first size to be written by performing an FSP operation for the zeroth nonvolatile memory chip 41A-0, from the write buffer 141 to the data input latch (DL) 321 of the zeroth nonvolatile memory chip 41A-0 (i.e., a data-in operation) ((2) in FIG. 10). The user data of the first size is, for example, data of 12 pages. The user data of the second size is, for example, user data 61 of one page. In addition, the second size is, for example, smaller than the size of user data received from the host 2 in accordance with receiving a write request from the host 2. The write control module 151 performs a data-in operation, for example, whenever user data of the second size is accumulated in the write buffer 141. User data being stored in the write buffer 141 is data that has not yet been written into the nonvolatile memory chip 41 (more specifically, the memory cell array 33). When user data of the second size has been transferred to the data input latch 321, the write control module 151 releases (frees) a storage area in the write buffer 141 where the user data of the second size has been stored. The released storage area becomes available to store new user data.

When user data 61 of one page has been input to each of the data input latches 321 in all of the planes 45-0, 45-1, 45-2, and 45-3 by data-in operations, the write control module 151 performs an operation of moving the user data 61 stored in the data input latch 321 to the zeroth program latch (zeroth PL) 322-0 (i.e., a data move operation), in each of the planes 45-0, 45-1, 45-2, and 45-3 ((3) in FIG. 10). The pieces of data stored in the zeroth program latches 322-0 are, for example, pieces of data to be programmed into the respective plane blocks PB0, PB1, PB2, and PB3 as pieces of lower page data.

The operations for storing, in the zeroth program latches 322-0 of the respective planes 45-0, 45-1, 45-2, and 45-3, the pieces of data to be programmed into the respective plane blocks PB0, PB1, PB2, and PB3 as the pieces of lower page data will be more specifically described.

First, for example, when user data 61 of one page has been accumulated in the write buffer 141, the write control module 151 transfers the user data 61 of one page from the write buffer 141 to the data input latch 321 of the zeroth plane 45-0. The write control module 151 releases a storage area in the write buffer 141 where the transferred user data 61 of one page has been stored. The released storage area becomes available to store new user data.

Next, when user data 61 of one page has been newly accumulated in the write buffer 141, the write control module 151 transfers the user data 61 of one page from the write buffer 141 to the data input latch 321 of the first plane 45-1. The write control module 151 releases a storage area in the write buffer 141 where the transferred user data 61 of one page has been stored.

In a similar way, the write control module 151 transfers user data 61 of one page from the write buffer 141 to the data input latch 321 of the second plane 45-2. Then, the write control module 151 transfers user data 61 of one page from the write buffer 141 to the data input latch 321 of the third plane 45-3.

When the pieces of user data 61 of one page have been stored in the data input latches 321 in all of the planes 45-0, 45-1, 45-2, and 45-3, the write control module 151 moves the user data 61 stored in the data input latch 321 to the zeroth program latch 322-0, in each of the planes 45-0, 45-1, 45-2, and 45-3. In this way, the pieces of data to be programmed into the respective plane blocks PB0, PB1, PB2, and PB3 as pieces of lower page data are stored in the zeroth program latches 322-0 of the respective planes 45-0, 45-1, 45-2, and 45-3.

Then, the write control module 151 performs operations for storing, in the first program latches (first PLs) 322-1 of the respective planes 45-0, 45-1, 45-2, and 45-3, pieces of data to be programmed into the respective plane blocks PB0, PB1, PB2, and PB3 as pieces of middle page data. The specific operations correspond to operations with the zeroth program latches 322-0 replaced by the first program latches 322-1 in the above-described data-in operations and data move operations of storing the pieces of lower page data in the zeroth program latches 322-0.

Then, the write control module 151 performs operations for storing, in the second program latches (second PLs) 322-2 of the respective planes 45-0, 45-1, 45-2, and 45-3, pieces of user data to be programmed into the respective plane blocks PB0, PB1, PB2, and PB3 as pieces of upper page data. The specific operations correspond to operations with the zeroth program latches 322-0 replaced by the second program latches 322-2 in the above-described data-in operations and data move operations of storing the pieces of lower page data in the zeroth program latches 322-0.

In this way, in all of the planes 45-0, 45-1, 45-2, and 45-3, the pieces of lower page data are stored in the zeroth program latches 322-0, the pieces of middle page data are stored in the first program latches 322-1, and the pieces of upper page data are stored in the second program latches 322-2. That is, data of 12 pages (i.e., data of the first size) necessary to perform an FSP operation for the zeroth nonvolatile memory chip 41-0 is input to the nonvolatile memory chip 41 by performing the data-in operation of inputting data of one page (i.e., user data of the second size) to the zeroth nonvolatile memory chip 41-0 12 times.

Then, the write control module 151 programs the pieces of data stored in the program latches 322-0, 322-1, and 322-2 into the corresponding plane block PB0, PB1, PB2, or PB3, in each of the planes 45-0, 45-1, 45-2, and 45-3 ((4) in FIG. 10). That is, the write control module 151 performs the FSP operation for the zeroth nonvolatile memory chip 41-0. Specifically, in the zeroth plane 45-0, the write control module 151 programs the lower page data stored in the zeroth program latch 322-0, the middle page data stored in the first program latch 322-1, and the upper page data stored in the second program latch 322-2 into the zeroth plane block PB0. The write control module 151 similarly programs the lower page data, the middle page data, and the upper page data into the corresponding plane block PB1, PB2, or PB3, in each of the first plane 45-1, the second plane 45-2, and the third plane 45-3.

By the above-described write operation, the write control module 151 can perform the FSP operation according to the TLC mode and the multi-plane program for the zeroth nonvolatile memory chip 41-0. The write control module 151, for example, similarly performs FSP operations according to the TLC mode and the multi-plane program also for the first nonvolatile memory chip 41-1, the second nonvolatile memory chip 41-2, and the third nonvolatile memory chip 41-3 in the write order illustrated in FIG. 9. The write control module 151 thereby can perform the interleave write operation for the four nonvolatile memory chips 41-0, 41-1, 41-2, and 41-3.

In this write operation, the write control module 151 transfers user data of the second size that is smaller than user data of the first size to be written in an FSP operation for the nonvolatile memory chip 41, from the write buffer 141 to each of the data input latches 321. For example, the write control module 151 transfers a piece of user data of the second size accumulated in the write buffer 141 to one of the data input latches 321 one by one. Then, the write control module 151 releases a storage area in the write buffer 141 where the user data of the second size transferred to the one of the data input latches 321 has been stored. The released storage area becomes available to store new user data.

Thus, in the memory system 3 of the first embodiment, the size of the write buffer 141 can be reduced, for example, compared to that of the memory system 3A of the comparative example, in which data of the first size (e.g., data of 12 pages) to be programmed into the nonvolatile memory chip 41A in an FSP operation is input to the nonvolatile memory chip 41A after it is accumulated in the write buffer 141A.

A read operation in the memory system 3 is similar to the read operation in the memory system 3A of the comparative example illustrated in FIG. 8, except that pieces of data that have been read from the nonvolatile memory chip 41 and stored in the read buffer 142 in accordance with a read request from the host 2 are transferred to the host 2, not in the write order illustrated in FIG. 6, but in the write order illustrated in FIG. 9. Specifically, in response to receiving a read request from the host 2, the read control module 152, for example, reads pieces of user data from the four nonvolatile memory chips 41-0, 41-1, 41-2, and 41-3 in parallel and stores the read pieces of user data in the read buffer 142. Then, the read control module 152 transfers the pieces of user data stored in the read buffer 142 to the host 2 in the write order illustrated in FIG. 9. That is, the read control module 152 executes control such that the order in which the pieces of user data stored in the read buffer 142 are transferred to the host 2 conforms to the write order illustrated in FIG. 9. Accordingly, the size of the read buffer 142 can be reduced as described above with reference to FIG. 9.

Figure 11:
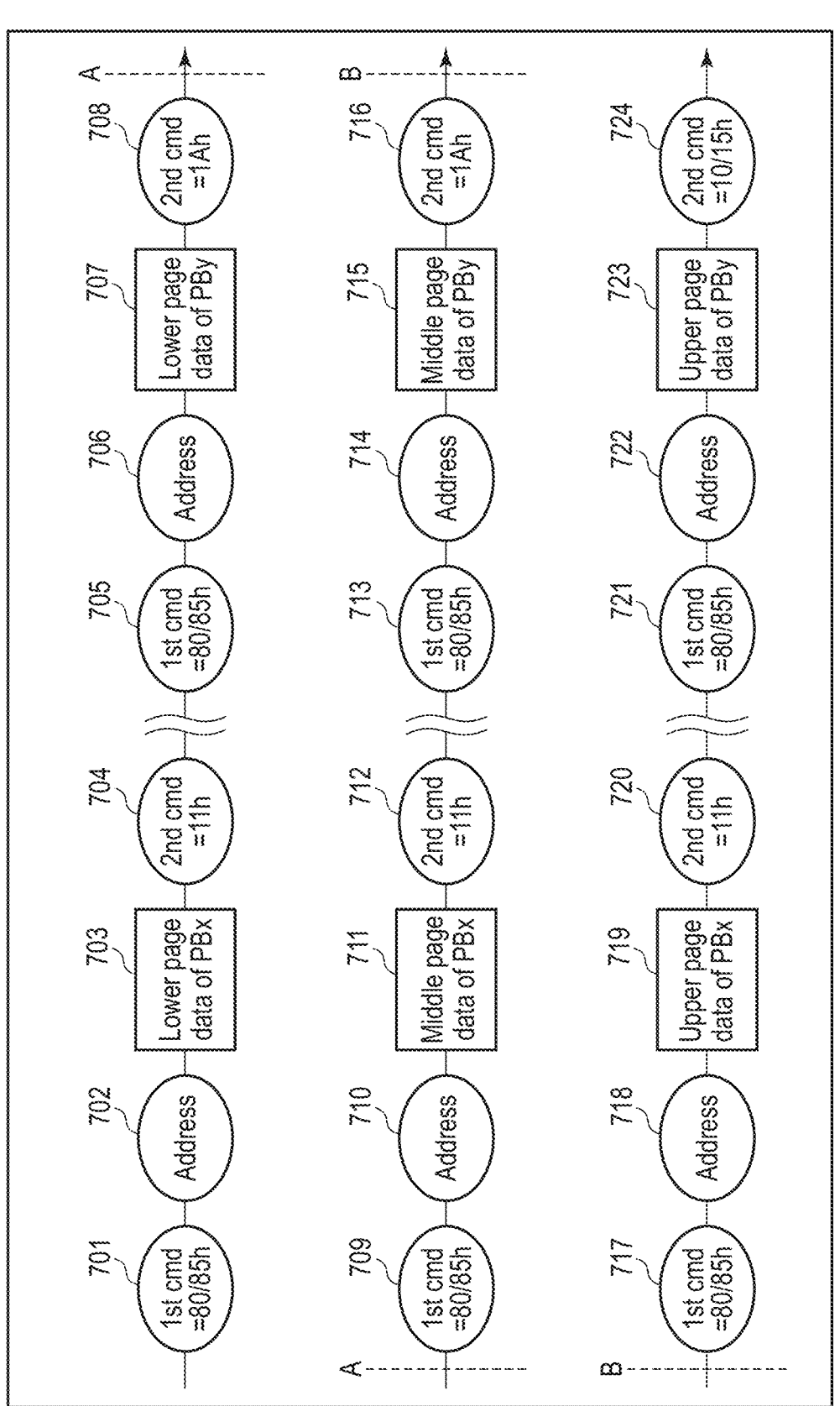
FIG. 11 is a diagram illustrating an example of a command sequence for a nonvolatile memory chip included in the memory system according to the first embodiment.

FIG. 11 illustrates an example of a command sequence for a nonvolatile memory chip 41. This command sequence corresponds to an FSP operation for the nonvolatile memory chip 41. It is here assumed that the FSP operation according to the TLC mode and the multi-plane program is performed for the nonvolatile memory chip 41. This command sequence is, for example, sent to the nonvolatile memory chip 41 by the memory I/F 12 under control of the write control module 151. The nonvolatile memory chip 41 includes T planes 45. T plane blocks PBx, . . . , PBy included in the T planes 45, respectively, are allocated as write target blocks in the TLC mode. The plane 45 including the plane block PBx is referred to as a plane 45-x. The plane 45 including the plane block PBy is referred to as a plane 45-y.

The command sequence illustrated in FIG. 11 includes a sequence from the start to timing A, a sequence from timing A to timing B, and a sequence from timing B to the end. The sequence from the start to the timing A is a sequence for inputting pieces of lower page data. The sequence from the timing A to the timing B is a sequence for inputting pieces of middle page data. The sequence from the timing B to the end is a sequence for inputting pieces of upper page data and programming the input pieces of lower page data, pieces of middle page data, and pieces of upper page data into the plane blocks. An instruction to the nonvolatile memory chip 41 is given, for example, in units of a set of a first command, an address, data, and a second command. The sequence from the start to the timing A, the sequence from the timing A to the timing B, and the sequence from the timing B to the end will be described hereinafter in order.

(Sequence from the Start to the Timing A: Input of Lower Page Data)

First, the memory I/F 12 sends a first command 701, an address 702, lower page data 703 (i.e., a piece of lower page data), and a second command 704 to the plane 45-x of the nonvolatile memory chip 41. The first command 701 is a command "80h" or "85h". The commands "80h" and "85h" are commands to start data input. The address 702 designates the plane block PBx, into which the lower page data 703 is to be written. The lower page data 703 is user data for a lower page to be written into the plane block PBx. The second command 704 is a command "11h". The command "11h" is a command to keep input data in the latch 32 (here, the data input latch 321) as it is. The value defined as each command is an example, and a value defined according to the standard or specification is used. On the basis of the first command 701, the address 702, the lower page data 703, and the second command 704, the lower page data 703 transferred from the write buffer 141 is stored in (i.e., input to) the data input latch 321 of the plane 45-x.

The memory I/F 12 similarly executes the sequence for storing lower page data transferred from the write buffer 141, in the data input latch 321 of the corresponding plane 45, also for each of the planes 45 other than the planes 45-x and 45-y among the T planes 45.

Then, the memory I/F 12 sends a first command 705, an address 706, lower page data 707, and a second command 708 to the plane 45-y of the nonvolatile memory chip 41. The first command 705 is the command "80h" or "85h". The address 706 designates the plane block PBy into which the lower page data 707 is to be written. The lower page data 707 is user data for a lower page to be written into the plane block PBy. The second command 708 is a command "1Ah". The command "1Ah" is a command to move pieces of data input in the data input latches 321 of the T planes 45 to the program latches 322 and prepare for data input of a next page.

On the basis of the first command 705, the address 706, the lower page data 707, and the second command 708, the lower page data 707 transferred from the write buffer 141 is stored in the data input latch 321 of the plane 45-y, and moreover, the lower page data stored in the data input latch 321 is moved to the zeroth program latch 322-0, in each of the T planes 45. Specifically, the lower page data 703 stored in the data input latch 321 of the plane 45-x is moved to the zeroth program latch 322-0 of the plane 45-x. In addition, the lower page data 707 stored in the data input latch 321 of the plane 45-y is moved to the zeroth program latch 322-0 of the plane 45-y. Accordingly, the pieces of lower page data are stored in the zeroth program latches 322-0 in all of the T planes 45 by the sequence from the start to the timing A.

(Sequence from the Timing a to the Timing B: Input of Middle Page Data)

Next, the memory I/F 12 sends a first command 709, an address 710, middle page data 711, and a second command 712 to the plane 45-x of the nonvolatile memory chip 41. The first command 709 is the command "80h" or "85h". The address 710 designates the plane block PBx into which middle page data 711 is to be written. The middle page data 711 is user data for a middle page to be written into the plane block PBx. The second command 712 is the command "11h". On the basis of the first command 709, the address 710, the middle page data 711, and the second command 712, the middle page data 711 transferred from the write buffer 141 is stored in the data input latch 321 of the plane 45-x.

The memory I/F 12 similarly executes the sequence for transferring middle page data to the data input latch 321 of a corresponding plane 45, also for each of the planes 45 other than the planes 45-*x* and 45-*y* among the T planes 45.

Then, the memory I/F 12 sends a first command 713, an address 714, middle page data 715, and a second command 716 to the plane 45-*y* of the nonvolatile memory chip 41. The first command 713 is the command "80h" or "85h". The address 714 designates the plane block PBy into which the middle page data 715 is to be written. The middle page data 715 is user data for a middle page to be written into the plane block PBy. The second command 716 is the command "1Ah".

On the basis of the first command 713, the address 714, the middle page data 715, and the second command 716, the middle page data 715 transferred from the write buffer 141 is stored in the data input latch 321 of the plane 45-*y*, and moreover, the middle page data stored in the data input latch 321 is moved to the first program latch 322-1, in each of the T planes 45. Specifically, the middle page data 711 stored in the data input latch 321 of the plane 45-*x* is moved to the first program latch 322-1 of the plane 45-*x*. In addition, the middle page data 715 stored in the data input latch 321 of the plane 45-*y* is moved to the first program latch 322-1 of the plane 45-*y*. Accordingly, the pieces of middle page data are stored in the first program latches 322-1 in all of the T planes 45 by the sequence from the timing A to the timing B.
(Sequence from the Timing B to the End: Input of Upper Page Data and Program)

Next, the memory I/F 12 sends a first command 717, an address 718, upper page data 719, and a second command 720 to the plane 45-*x* of the nonvolatile memory chip 41. The first command 717 is the command "80h" or "85h". The address 718 designates the plane block PBx into which the upper page data 719 is to be written. The upper page data 719 is user data for an upper page to be written into the plane block PBx. The second command 720 is the command "11h". On the basis of the first command 717, the address 718, the upper page data 719, and the second command 720, the upper page data 719 transferred from the write buffer 141 is stored in the data input latch 321 of the plane 45-*x*.

The memory I/F 12 similarly executes the sequence for transferring upper page data to the data input latch 321 of a corresponding plane 45, also for each of the planes 45 other than the planes 45-*x* and 45-*y* among the T planes 45.

Then, the memory I/F 12 sends a first command 721, an address 722, upper page data 723, and a second command 724 to the plane 45-*y* of the nonvolatile memory chip 41. The first command 721 is the command "80h" or "85h". The address 722 designates the plane block PBy into which the upper page data 723 is to be written. The upper page data 723 is user data for an upper page to be written into the plane block PBy. The second command 724 is a command "10h" or "15h". The command "10h" or "15h" is a command to start program operations based the designated contents.

On the basis of the first command 721, the address 722, the upper page data 723, and the second command 724, the upper page data 723 transferred from the write buffer 141 is stored in the data input latch 321 of the plane 45-*y*, and in each of the T planes 45, the upper page data stored in the data input latch 321 is moved to the second program latch 322-2, and the lower page data, the middle page data, and the upper page data stored in the respective program latches 322-0, 322-1, and 322-3 are programmed into the plane block.

Specifically, the upper page data 719 stored in the data input latch 321 of the plane 45-*x* is moved to the second program latch 322-2 of the plane 45-*x*. Then, in the plane 45-*x*, the lower page data 703 stored in the zeroth program latch 322-0, the middle page data 711 stored in the first program latch 322-1, and the upper page data 719 stored in the second program latch 322-2 are programmed into the plane block PBx.

In addition, the upper page data 723 stored in the data input latch 321 of the plane 45-*y* is moved to the second program latch 322-2 of the plane 45-*y*. Then, in the plane 45-*y*, the lower page data 707 stored in the zeroth program latch 322-0, the middle page data 715 stored in the first program latch 322-1, and the upper page data 723 stored in the second program latch 322-2 are programmed into the plane block PBy.

By the above-described command sequence, the memory I/F 12 can perform the FSP operation according to the TLC mode and the multi-plane program, for the nonvolatile memory chip 41 including the T planes 45. In this command sequence, user data of one page is transferred from the write buffer 141 to a data input latch 321 of the data input latches 321 of the nonvolatile memory chip 41, for example, whenever the user data of one page is accumulated in the write buffer 141. When the user data has been transferred to the data input latch 321, a storage area in the write buffer 141 where the user data has been stored is released. In addition, the user data stored in the data input latch 321 is moved to a program latch 322 of the program latches 322. Accordingly, in the memory system 3, not only the write buffer 141 but also the data input latches 321 and the program latches 322 are used as buffers of user data to be written into the nonvolatile memory chip 41. Thus, in the memory system 3, the size of the write buffer 141 can be reduced, for example, compared to that of the memory system 3A of the comparative example, in which user data of all pages (here, user data of T×three pages) to be programmed into the nonvolatile memory chip 41A in an FSP operation is input to the nonvolatile memory chip 41A after it is accumulated in the write buffer 141A.

In a case where the interleave write operation is performed for the nonvolatile memory chips 41, for example, the memory I/F 12 executes the command sequence illustrated in FIG. 11 for each of the nonvolatile memory chips 41 in parallel. In addition, the types of command, the number of latches 32, and the like, described above are examples, and the write operation in the memory system 3 of the first embodiment can be applied to any configuration for writing a specific amount of data into one or more blocks at once.

FIG. 12A and FIG. 12B are flowcharts illustrating an example of the procedure of a write control process executed by the CPU 15. The write control process is a process for writing user data into the memory device 4. The CPU 15 executes the write control process, for example, in accordance with receiving a write command from the host 2. The description here explains a case where user data is written into S nonvolatile memory chips 41 in parallel as an example. Each of the S nonvolatile memory chips 41 includes T planes 45. S is an integer of one or more. T is an integer of one or more. In addition, in the write control process, data is written into a block (plane block) in a first mode. The first mode is a mode in which data of M pages is written (i.e., M-bit data is written per memory cell) in a program operation. In the following description, it is assumed that M is an integer of two or more.

First, the CPU 15 sets each of variables i, j, and k to zero (step S101). The variable i is used to identify one of the S nonvolatile memory chips 41. The variable j is used to identify one of the T planes 45. The variable k is used to identify data of one page among data of M pages to be written into one plane block in a program operation. For example, in a case where data of three pages is written into one plane block in a program operation (i.e., in a case where the first mode is the TLC mode), the variable k identifies one of a lower page, a middle page, and an upper page. Specifically, for example, the variable k that is zero indicates the lower page, the variable k that is one indicates the middle page, and the variable k that is two indicates the upper page.

Next, the CPU 15 determines whether user data of one page has been stored in the write buffer 141 (step S102).

When user data of one page is not stored in the write buffer 141 (No in step S102), the process by the CPU 15 returns to step S102. That is, the CPU 15 waits until user data of one page is stored in the write buffer 141.

When user data of one page has been stored in the write buffer 141 (Yes in step S102), the CPU 15 transfers the user data of one page from the write buffer 141 to the data input latch 321 of the j-th plane 45 in the i-th nonvolatile memory chip 41 (step S103). The CPU 15 releases a storage area in the write buffer 141 where the transferred user data has been stored (step S104). The CPU 15 updates the variable j by adding one to the variable j (step S105). Then, the CPU 15 determines whether the updated variable j is equal to the number T of planes (step S106).

When the updated variable j is smaller than the number T of planes (No in step S106), the process by the CPU 15 returns to step S102. That is, the CPU 15 further performs a process for transferring user data of one page to the data input latch 321 of the j-th plane 45 in the i-th nonvolatile memory chip 41 on the basis of the updated variable j. Accordingly, the CPU 15 repeatedly performs the procedure from step S102 to step S106 until user data of one page is transferred to each of the data input latches 321 of the respective T planes 45 in the i-th nonvolatile memory chip 41.

When the updated variable j is equal to the number T of planes (Yes in step S106), as illustrated in FIG. 12B, the CPU 15 moves the user data of one page from the data input latch 321 to the k-th program latch 322, in each of the T planes 45 in the i-th nonvolatile memory chip 41 (step S107). The CPU 15 sets the variable j to zero (step S108). Then, the CPU 15 determines whether the variable k is equal to a value obtained by subtracting one from the number M of pages (step S109).

When the variable k is smaller than the value obtained by subtracting one from the number M of pages (No in step S109), the CPU 15 updates the variable i by adding one to the variable i (step S110). Then, the CPU 15 determines whether the updated variable i is equal to the number S of nonvolatile memory chips (step S111).

When the updated variable i is smaller than the number S of nonvolatile memory chips (No in step S111), the process by the CPU 15 returns to step S102 as illustrated in FIG. 12A. That is, the CPU 15 further performs a process for transferring user data of one page to the k-th program latch 322-*k* of each of the planes 45, for the i-th nonvolatile memory chip 41 based on the updated variable i.

When the updated variable i is equal to the number S of nonvolatile memory chips (Yes in step S111), the CPU 15 sets the variable i to zero (step S112). Then, the CPU 15 updates the variable k by adding one to the variable k (step S113), and returns to step S102 as illustrated in FIG. 12A. That is, the CPU 15 further performs a process for transferring user data of one page to the k-th program latch 322-*k* of each of the planes 45, for each of the S nonvolatile memory chips 41, on the basis of the updated variable k.

In addition, when the variable k is equal to the value obtained by subtracting one from the number M of pages (Yes in step S109), the CPU 15 performs an FSP operation for the i-th nonvolatile memory chip 41 (step S114). When the variable k is equal to the value obtained by subtracting one from the number M of pages, user data to be written in the FSP operation for the i-th nonvolatile memory chip 41 has been stored in the M program latches 322 of each of the T planes 45 in the i-th nonvolatile memory chip 41. The CPU 15 programs the stored user data into T plane blocks included in the T planes 45, respectively, in the FSP operation. That is, in each of the T planes 45, user data of M pages stored in the M program latches 322, respectively, is written into the plane block in the corresponding plane 45.

Next, the CPU 15 updates the variable i by adding one to the variable i (step S115). The CPU 15 determines whether the updated variable i is equal to the number S of nonvolatile memory chips (step S116).

When the updated variable i is smaller than the number S of nonvolatile memory chips (No in step S116), the process by the CPU 15 returns to step S102 as illustrated in FIG. 12A. That is, the CPU 15 further performs a process for transferring user data of one page to the k-th program latch 322-*k* of each of the planes 45, for the i-th nonvolatile memory chip 41 based on the updated variable i.

When the updated variable i is equal to the number S of nonvolatile memory chips (Yes in step S116), the CPU 15 determines whether data is to be written into the next string (step S117). For example, the CPU 15 determines whether data needs to be written into the next string in accordance with a write request from the host 2.

When data is to be written into the next string (Yes in step S117), as illustrated in FIG. 12A, the process by the CPU 15 returns to step S101 and a process for writing data into the next string is performed.

When no data is to be written into the next string (No in step S117), the CPU 15 ends the write control process.

By the above-described write control process, the CPU 15 can reduce the size of the write buffer 141 in the memory system 3 in a case where the FSP operation for each of the S nonvolatile memory chips 41 is performed in parallel. Specifically, the CPU 15 transfers user data of one page stored in the write buffer 141 to the data input latch 321 without waiting until all the user data to be written in the FSP operation is accumulated in the write buffer 141. The CPU 15 further transfers the user data of one page stored in the data input latch 321 to one of the program latches 322. In this way, the user data to be written in the FSP operation is stored in the latches 32, and the time for which data remains in the write buffer 141 is shortened, so that the size of the write buffer 141 in the memory system 3 can be reduced.

Moreover, the size of the read buffer 142 also can be reduced by using the write order illustrated in FIG. 9 as the write order for the S nonvolatile memory chips 41.

Accordingly, in the memory system 3, the size of the data buffer used when the host 2 accesses the nonvolatile memory chip 41 can be reduced.

Second Embodiment

In the memory system 3 of the first embodiment, the controller 6 performs a data transfer operation of transferring user data of the second size that is smaller than user data of the first size to be written in a write operation (e.g., an FSP operation) for the nonvolatile memory chip 41, from the write buffer 141 to the latch 32 multiple times. In addition, the controller 6 writes, into the memory cell array 33, pieces of user data of the second size transferred to the latches 32 by performing the data transfer operation the multiple times, respectively. In contrast, the memory system 3 of the second embodiment further includes a configuration for storing user data in a non-volatile way when receiving a request for nonvolatilization of user data from the host 2 while the size (third size) of user data that has not yet been written into the memory cell array 33 of the nonvolatile memory chip 41 after being received from the host 2 is smaller than the first size.

A configuration of the memory system 3 according to the second embodiment is similar to that of the memory system 3 of the first embodiment. The memory system 3 of the second embodiment is different from the memory system 3 of the first embodiment in terms of the memory system 3 of the second embodiment including the configuration for storing user data in a non-volatile way. Hereinafter, the difference from the first embodiment will be mainly described.

The write control module 151 of the controller 6 transfers user data of the second size to the data input latch 321 of the nonvolatile memory chip 41 in response to the user data of the second size being accumulated in the write buffer 141. That is, the write control module 151 starts data input to the nonvolatile memory chip 41 before receiving, from the host 2, user data of the first size to be written in an FSP operation for the nonvolatile memory chip 41. In this case, after data input to the nonvolatile memory chip 41 is started, user data necessary for the FSP operation is not always received from the host 2.

When receiving a request for nonvolatilization of user data (e.g., a flush command) from the host 2 while the third size of user data that has not yet been written into the memory cell array 33 of the nonvolatile memory chip 41 after being received from the host 2 is smaller than the first size, the write control module 151 transfers dummy data of a fourth size that is obtained by subtracting the third size from the first size, to the latch 32 of the nonvolatile memory chip 41. Then, the write control module 151 writes the user data of the third size and the dummy data of the fourth size into the memory cell array 33. The dummy data is, for example, a data string in which all bits are zero. In a case where data (e.g., the user data of the third size and the dummy data of the fourth size) is to be written into the memory cell array 33, the write control module 151 may randomize the data and write (program) the randomized data into the memory cell array 33.

In this way, the user data received from the host 2 can be stored in a non-volatile way also when a nonvolatilization request is received from the host 2 before user data necessary for an FSP operation is received from the host 2 after data input to the nonvolatile memory chip 41 is started.

Accordingly, in the memory system 3 of the second embodiment, it is possible to perform a process in response to a nonvolatilization request from the host 2 as well as reducing the sizes of the write buffer 141 and the read buffer 142.

FIG. 13A and FIG. 13B are flowcharts illustrating an example of the procedure of a nonvolatilization process executed by the CPU 15 (more specifically, the write control module 151). The nonvolatilization process is a process for storing, in a non-volatile way, user data that has not yet been written into the nonvolatile memory chip 41 after being received from the host 2 (i.e., writing the user data into the nonvolatile memory chip 41). The CPU 15 executes the nonvolatilization process, for example, in response to receiving a nonvolatilization request from the host 2 while performing the write control process described above with reference to FIG. 12A and FIG. 12B. The values of the variables i, j, and k in the write control process that is being performed are used as values of variables i, j, and k used in the nonvolatilization process, respectively. In addition, the number S of nonvolatile memory chips, the number T of planes, and the number M of pages are the same as those of the write control process.

First, the CPU 15 determines whether user data has been stored in the write buffer 141 (step S201).

When user data has been stored in the write buffer 141 (Yes in step S201), the CPU 15 determines whether the user data stored in the write buffer 141 is user data of one or more pages (step S202).

When the user data stored in the write buffer 141 is user data of one or more pages (Yes in step S202), the CPU 15 transfers user data of one page from the write buffer 141 to the data input latch 321 of the j-th plane 45 in the i-th nonvolatile memory chip 41 (step S203), and proceeds to step S205.

When the user data stored in the write buffer 141 is user data of less than one page (No in step S202), the CPU 15 transfers data of one page that is composed of the user data of less than one page and dummy data to the data input latch 321 of the j-th plane 45 in the i-th nonvolatile memory chip 41 (step S204), and proceeds to step S205.

Then, the CPU 15 releases a storage area in the write buffer 141 where the transferred user data has been stored (step S205), and proceeds to step S207.

In addition, when user data is not stored in the write buffer 141 (No in step S201), the CPU 15 transfers dummy data of one page to the data input latch 321 of the j-th plane 45 in the i-th nonvolatile memory chip 41 (step S206), and proceeds to step S207.

Next, the CPU 15 updates the variable j by adding one to the variable j (step S207). Then, the CPU 15 determines whether the updated variable j is equal to the number T of planes (step S208).

When the updated variable j is smaller than the number T of planes (No in step S208), the process by the CPU 15 returns to step S201. That is, the CPU 15 further performs a process for transferring data of one page to the data input latch 321 of the j-th plane 45 in the i-th nonvolatile memory chip 41 on the basis of the updated variable j. Accordingly, the CPU 15 repeatedly performs the procedure from step S201 to step S208 until data of one page is transferred to each of the data input latches 321 of the respective T planes 45 in the i-th nonvolatile memory chip 41. The transferred data of one page is composed of at least one of user data and dummy data.

When the updated variable j is equal to the number T of planes (Yes in step S208), as illustrated in FIG. 13B, the CPU 15 moves the data of one page from the data input latch 321 to the k-th program latch 322, in each of the T planes 45 in the i-th nonvolatile memory chip 41 (step S209).

The following procedure from step S210 to step S218 is similar to the procedure from step S108 to step S116 of the write control process described above with reference to FIG. 12A and FIG. 12B. In step S107 of the write control process illustrated in FIG. 12B, user data of one page is transferred from the data input latch 321 to the k-th program latch 322-k. In contrast, in step S209 of the nonvolatilization process illustrated in FIG. 13B, any one of the user data of one page transferred to the data input latch 321 in step S203, the data of one page composed of the user data and the dummy data transferred to the data input latch 321 in step S204, and the dummy data of one page transferred in step S206 is transferred to the k-th program latch 322-*k*. The transferred data is written into a plane block by performing the FSP operation for each of the nonvolatile memory chips 41.

By the above-described nonvolatilization process, the CPU 15 can store, in a non-volatile way, user data received from the host 2 in response to a nonvolatilization request, even when the amount of user data received from the host 2 is less than the amount of data necessary for an FSP operation. The CPU 15 can input data necessary for the FSP operation to the nonvolatile memory chip 41 by transferring dummy data to the data input latch 321 and the program latch 322.

Third Embodiment

In the memory system 3 of the first embodiment, the controller 6 performs a data transfer operation of transferring user data of the second size, which is smaller than user data of the first size to be written in a write operation for the nonvolatile memory chip 41, from the write buffer 141 to the latch 32 multiple times. Then, the controller 6 writes pieces of user data of the second size transferred to the latches 32 by performing the data transfer operation the multiple times, respectively, into the memory cell array 33 in the first mode.

In addition, the memory system 3 of the second embodiment includes the configuration for storing, in a non-volatile way, user data with dummy data in the first mode, when receiving a request for nonvolatilization of user data from the host 2 while the third size of user data that has not yet been written into the memory cell array 33 of the nonvolatile memory chip 41 after being received from the host is smaller than the first size.

In contrast, a memory system 3 of a third embodiment includes a configuration for storing, in a non-volatile way, user data that has been input to the latch 32 (or latches 32) in a second mode different from the first mode, when receiving a request for nonvolatilization of data from the host 2 while the user data that has been input to the latch 32 is smaller than the first size.

The configuration of the memory system 3 according to the third embodiment is similar to those of the memory systems 3 of the first and second embodiments. The memory system 3 of the third embodiment is different from the memory systems 3 of the first and second embodiments in terms of the memory system 3 of the third embodiment including the configuration for storing, in a non-volatile way, user data in the second mode. Hereinafter, the difference from the first and second embodiments will be mainly described.

The write control module 151 of the controller 6 performs a data transfer operation of transferring user data of the second size, which is smaller than user data of the first size to be written in a write operation for the nonvolatile memory chip 41, from the write buffer 141 to the latch 32 of the nonvolatile memory chip 41 multiple times. Then, the write control module 151 writes pieces of user data of the second size into the memory cell array 33 in the first mode.

When receiving a request for nonvolatilization of user data from the host 2 while the total size of one or more pieces of user data of the second size that have been transferred to the latches 32 of the nonvolatile memory chip 41 and have not yet been written into the memory cell array 33 is smaller than the first size, the write control module 151 stores, in a non-volatile way, at least part of the pieces of user data that have been input to the latches 32 in the second mode different from the first mode. The pieces of user data that have been input to the latches 32 are, for example, user data stored in at least any one of the data input latch 321, the zeroth program latch 322-0, the first program latch 322-1, and the second program latch 322-2. Specifically, the write control module 151 writes, in the second mode, at least part of the pieces of user data that have been input to the latches 32 into another block in the plane 45 that includes a write target block in the first mode (e.g., the plane block PB0, PB1, PB2, or PB3).

The first mode is a mode in which M-bit data is written per memory cell. The second mode is a mode in which N-bit data is written per memory cell. M is an integer of two or more. N is smaller than M. For example, in a case where the TLC mode is used as the first mode, the SLC mode is used as the second mode. Accordingly, the size of data necessary for a program operation in the second mode is smaller than the size of data necessary for a program operation in the first mode.

Figure 14:
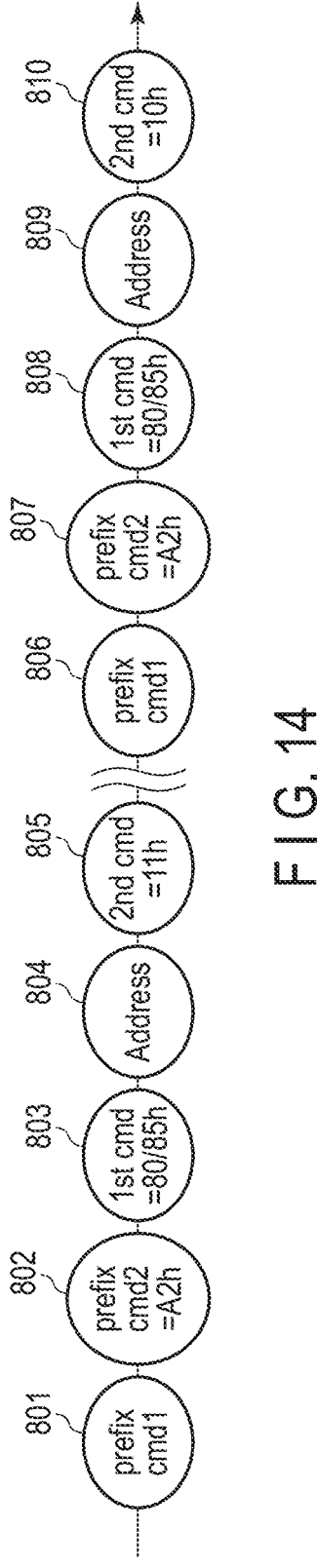
FIG. 14 is a diagram illustrating an example of a command sequence for a nonvolatile memory chip included in a memory system according to a third embodiment.

FIG. 14 illustrates an example of a command sequence for a nonvolatile memory chip 41. This command sequence corresponds to a nonvolatilization operation for the non-volatile memory chip 41. It is here assumed that the non-volatilization operation is performed for the nonvolatile memory chip 41 including multiple planes 45. This command sequence is, for example, sent to the nonvolatile memory chip 41 by the memory I/F 12 under control of the write control module 151. An instruction to the nonvolatile memory chip 41 is given, for example, in units of a set of a first prefix command, a second prefix command, a first command, an address, and a second command.

First, the memory I/F 12 sends a first prefix command 801, a second prefix command 802, a first command 803, an address 804, and a second command 805 to the nonvolatile memory chip 41. The first prefix command 801 is, for example, one of commands "01h", "02h", and "03h". Each of the commands "01h", "02h", and "03h" is a command to designate a latch 32 in which data to be programmed is stored among the data input latch 321 and the program latches 322-0, 322-1, and 322-2. The latch 32 designated by the first prefix command 801 is referred to as a first target latch 32. Data stored in the first target latch 32 is referred to as first data. The second prefix command 802 is, for example, a command "A2h". The command "A2h" is a command to designate the second mode in which data is to be programmed. The first command 803 is a command "80h" or "85h". Each of the commands "80h" and "85h" is a command to start data input. The address 804 designates a block into which the first data is to be programmed in the second mode (hereinafter, referred to as a first block). In a case where a plane 45 includes a block into which the first data was to be programmed in the first mode, the first block is another block in the plane 45. The address 804 may further designate a string in the first block into which the first data is to be programmed in the second mode. The second command 805 is, for example, a command "11h". The command "11h" is a command to keep input data in the latch 32 as it is. The memory I/F 12 sends the command "11h" as the second command 805 in a case where nonvolatilization operations for the other planes 45 in the nonvolatile memory chip 41 are performed in parallel.

On the basis of the first prefix command 801, the second prefix command 802, the first command 803, the address 804, and the second command 805, it is designated that the first data stored in the first target latch 32 is to be programmed into the first block (more specifically, the string in the first block) in the second mode.

The memory I/F 12 similarly executes a sequence for designating that data that has been input to any one of the latches 32 is to be programmed into a block other than a block into which the data was to be programmed in the first mode, in the second mode also for another plane 45.

Then, the memory I/F 12 sends a first prefix command 806, a second prefix command 807, a first command 808, an address 809, and a second command 810 to the nonvolatile memory chip 41. The first prefix command 806 is, for example, one of the commands "01h", "02h", and "03h". The latch 32 designated by the first prefix command 806 is referred to as a second target latch 32. Data stored in the second target latch 32 is referred to as second data. The second prefix command 807 is, for example, the command "A2h". The first command 808 is the command "80h" or "85h". The address 809 designates a block into which the second data is to be programmed in the second mode (hereinafter, referred to as a second block). In a case where a plane 45 includes a block into which the second data was to be programmed in the first mode, the second block is another block in the plane 45. The address 809 may further designate a string in the second block into which the second data is to be programmed in the second mode. The second command 810 is, for example, a command "10h". The command "10h" is a command to start programming based on the designated contents.

On the basis of the first prefix command 806, the second prefix command 807, the first command 808, the address 809, and the second command 810, data stored in the designated latch 32 is programmed into the designated block (more specifically, the designated string in the designated block) in the designated mode. Specifically, the first data stored in the first target latch 32 is programmed into the first block in the second mode. In addition, the second data stored in the second target latch 32 is programmed into the second block in the second mode. Note that in a case where the designated latch 32 is the data input latch 321, data stored in the data input latch 321 may be moved to the program latch 322 and then programmed into the designated block.

In a case where data exceeding the size of data to be programmed in a program operation in the second mode is stored in the data input latch 321 and the program latches 322 of each of the planes 45, the memory I/F 12 repeatedly executes the command sequence illustrated in FIG. 14 in which the latches 32 designated by the first prefix commands 801 and 806 are changed. Data having a size to be programmed in a write operation in the second mode is, for example, data of one page in the case of a write operation in the SLC mode.

By the above-described command sequence, the memory I/F 12 can perform the nonvolatilization operation for the nonvolatile memory chip 41 including the planes 45. In this command sequence, the memory I/F 12 writes data that has been input to the latch 32 into a block in the second mode (e.g., the SLC mode). That is, the memory I/F 12 can write, for example, data of one page into a block in the SLC mode, without any restrictions when data is programmed in an FSP operation. In addition, it is also unnecessary to input dummy data to the nonvolatile memory chip 41 since data that has been input to the latch 32 is not written in the first mode (e.g., the TLC mode). Accordingly, the memory system 3 can store data that has been input to the latch 32, in a non-volatile way at high speed. Thus, the memory system 3 can respond to a nonvolatilization request from the host 2 with low latency.

FIG. 15 is a flowchart illustrating an example of the procedure of a nonvolatilization process executed by the CPU 15. The nonvolatilization process is a process for storing, in a non-volatile way, user data that has not yet been written into the nonvolatile memory chip 41 after being received from the host 2. The CPU 15 executes the non-volatilization process, for example, in response to receiving a nonvolatilization request from the host 2 while performing the write control process described above with reference to FIG. 12A and FIG. 12B. The CPU 15 executes the nonvola-tilization process, for example, for each of the S nonvolatile memory chips 41. The number S of nonvolatile memory chips and the number T of planes are the same as those of the write control process. In addition, it is assumed that in the nonvolatilization process, data is programmed into a block in the second mode. The second mode is a mode in which data of N pages is programmed (i.e., N-bit data is programmed per memory cell) in a program operation.

First, the CPU 15 determines whether pieces of user data have been stored in P program latches 322 of each of the planes 45 in the nonvolatile memory chip 41 (step S301). P is an integer that is larger than or equal to one but smaller than or equal to the number M of pages.

When none of the program latches 322 of each of the planes 45 stores user data (No in step S301), the process by the CPU 15 proceeds to step S306.

When pieces of user data have been stored in the P program latches 322 of each of the planes 45 (Yes in step S301), the CPU 15 sets a variable k to zero (step S302). The variable k is used to identify one of the P program latches 322 in which user data (i.e., a piece of user data) has been stored. The CPU 15 programs the user data stored in the k-th program latch 322-$k$ into a block of the corresponding plane 45 in the second mode, in each of the T planes 45 (step S303). The block into which data is programmed in the second mode is a block different from a block into which data is programmed in the first mode (e.g., a target block of an FSP operation in the write control process). The CPU 15 may perform programming of user data in the second mode for the T planes 45 in parallel. Next, the CPU 15 updates the variable k by adding one to the variable k (step S304). The CPU 15 determines whether the updated variable k is smaller than the number P of the program latches 322 each of which has stored user data (step S305).

When the updated variable k is smaller than P (Yes in step S305), the process by the CPU 15 returns to step S303. That is, the CPU 15 further performs a process for writing user data stored in the k-th program latch 322 in the second mode on the basis of the updated variable k.

When the updated variable k is equal to P (No in step S305), the process by the CPU 15 proceeds to step S306.

Then, the CPU 15 determines whether pieces of user data have been stored in the data input latches 321 of Q planes 45 in the nonvolatile memory chip 41 (step S306). Q is an integer that is larger than or equal to one but smaller than or equal to the number T of planes.

When pieces of user data have been stored in the data input latches 321 of the Q planes 45 (Yes in step S306), the CPU 15 programs the user data (i.e., piece of user data) stored in the data input latch 321 into a block in the corresponding plane 45 in the second mode, in each of the Q planes 45 (step S307), and ends the nonvolatilization process. When Q is larger than or equal to two, the CPU 15 may perform writing of user data in the second mode in the Q planes 45 in parallel. In addition, the CPU 15 may transfer user data stored in the data input latch 321 to the program latch 322 and then write the user data in the second mode.

When none of the data input latches 321 of the planes 45 stores user data (No in step S306), the CPU 15 ends the nonvolatilization process.

By the above-described nonvolatilization process, the CPU 15 can store, in a non-volatile way, user data stored in the data input latch 321 and user data stored in the program latch 322 in the second mode in response to a nonvolatilization request from the host 2. The CPU 15 can respond to the nonvolatilization request with low latency by writing user data in the second mode in which N-bit data is written per memory cell, compared to the case where user data and dummy data are written in the first mode in which M-bit data is written per memory cell. In addition, since data is programmed in units of data of a small size corresponding to the second mode (e.g., in units of 4 KB), it is unnecessary to, for example, input dummy data to the nonvolatile memory chip 41 as data necessary to perform an FSP operation. Note that the CPU 15 may similarly write user data stored in the write buffer 141 into a block in the second mode, in response to a nonvolatilization request from the host 2.

As described above, according to the first to third embodiments, the size of a data buffer used to access a nonvolatile memory can be reduced. In a case where data of the first size is to be written in a write operation for the nonvolatile memory chip 41, the write control module 151 performs a data transfer operation of transferring data of the second size smaller than the first size from the write buffer 141 to the nonvolatile memory chip 41 (more specifically, the latch 32) multiple times. The write control module 151 writes pieces of data of the second size transferred to the nonvolatile memory chip 41 by performing the data transfer operation the multiple times, respectively, into the memory cell array 33 of the nonvolatile memory chip 41.

In this way, in the memory system 3, the size of the write buffer 141 can be reduced, compared to that of the memory system 3A of the comparative example, in which data transfer to the nonvolatile memory chip 41A starts after data of the first size is accumulated in the write buffer 141A. Moreover, in the memory system 3, the size of the read buffer 142 also can be reduced by using the write order illustrated in FIG. 9. Accordingly, in the memory system 3, the sizes of the write buffer 141 and the read buffer 142 used when the host 2 accesses the nonvolatile memory chip 41 can be reduced.

Each of the various functions described in the first to third embodiments may be realized by a circuit (e.g., processing circuit). An exemplary processing circuit may be a programmed processor such as a central processing unit (CPU). The processor executes computer programs (instructions) stored in a memory thereby performs the described functions. The processor may be a microprocessor including an electric circuit. An exemplary processing circuit may be a digital signal processor (DSP), an application specific integrated circuit (ASIC), a microcontroller, a controller, or other electric circuit components. The components other than the CPU described according to these embodiments may be realized in a processing circuit.

While certain embodiments have been described, these embodiments have been presented by way of example only, and are not intended to limit the scope of the inventions. Indeed, the novel devices and methods described herein may be embodied in a variety of other forms; furthermore, various omissions, substitutions and changes in the form of the embodiments described herein may be made without departing from the spirit of the inventions. The accompanying claims and their equivalents are intended to cover such forms or modification as would fall within the scope and spirit of the inventions.

What is claimed is:

1. A memory system comprising:
a nonvolatile memory chip comprising a first plane and a second plane, the first plane including a first memory cell array, a first latch circuit, and a second latch circuit, the second plane including a second memory cell array, a third latch circuit, and a fourth latch circuit;
a write buffer that is capable of storing data received in accordance with receiving a write request from a host; and
a controller configured to transmit, to the nonvolatile memory chip,
a first command set that includes a first command to start data input, a first address indicative of a first block in the first memory cell array, first data to be written into the first block, and a second command to store the first data in the first latch circuit,
a second command set that includes a third command to start data input, a second address indicative of a second block in the second memory cell array, second data to be written into the second block, and a fourth command to move the first data stored in the first latch circuit to the second latch circuit and to move the second data input in the third latch circuit to the fourth latch circuit,
a third command set that includes a fifth command to start data input, a third address indicative of the first block, third data to be written into the first block, and a sixth command to store the third data in the first latch circuit, and
a fourth command set that includes a seventh command to start data input, a fourth address indicative of the second block, fourth data to be written into the second block, and an eighth command to program the first data, the second data, the third data, and the fourth data into the first memory cell array and the second memory cell array.

2. The memory system according to claim 1, wherein the received data is data of a first size, and the first data is data of a second size smaller than the first size.

3. The memory system according to claim 1, wherein each of the first data, the second data, the third data, and the fourth data is data of a second size smaller than data of a third size to be written in a write operation for the nonvolatile memory chip, and the controller is configured to:
when receiving a data nonvolatilization request from the host while a fourth size of data that is not yet written into memory cell arrays in the nonvolatile memory chip after being received from the host is smaller than the third size, transfer dummy data of a fifth size to the nonvolatile memory chip, the fifth size being obtained by subtracting the fourth size from the third size, the memory cell arrays including the first memory cell array and the second memory cell array; and
write the data of the fourth size and the dummy data of the fifth size into the memory cell arrays.

4. The memory system according to claim 1, wherein each of the first data, the second data, the third data, and the fourth data is data of a second size smaller than data of a third size to be written in a write operation for the nonvolatile memory chip, the first memory cell array includes the first block into which data is written in a first mode, and a third block into which data is written in a second mode different from the first mode, and the controller is configured to:

write the first data and the third data into the first block in the first mode; and when receiving a data nonvolatilization request from the host while a total size of one or more pieces of data of the second size that are transferred to the nonvolatile memory chip and are not yet written into memory cell arrays in the nonvolatile memory chip is smaller than the third size, write at least part of the one or more pieces of data of the second size into the third block in the second mode, the memory cell arrays including the first memory cell array and the second memory cell array.

5. The memory system according to claim 4, wherein the controller is configured to transmit, to the nonvolatile memory chip, a command set that includes a ninth command indicative of a fifth latch circuit in the first plane in which fifth data among the one or more pieces of data of the second size is stored, a tenth command designating the second mode, an eleventh command to start data input, a fifth address designating the third block, and a twelfth command to store the fifth data in the fifth latch circuit or to program the fifth data into the first memory cell array.

6. The memory system according to claim 4, wherein the first mode is a mode in which M-bit data is written per memory cell, the second mode is a mode in which N-bit data is written per memory cell, M is an integer of two or more, and N is smaller than M.

7. The memory system according to claim 2, wherein the controller is further configured to release a memory area in the write buffer where data of the second size is stored, after performing a data transfer operation of transferring the data of the second size from the write buffer to the nonvolatile memory chip.

8. The memory system according to claim 1, wherein the write buffer is included in the controller.

* * * * *